US012668131B2

(12) United States Patent
Wu

(10) Patent No.: US 12,668,131 B2
(45) Date of Patent: Jun. 30, 2026

(54) BATTERY SAFETY WARNING METHOD AND APPARATUS

(71) Applicant: Yinwang Intelligent Technologies Co., Ltd., Shenzhen (CN)

(72) Inventor: Zhengxing Wu, Shenzhen (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/677,123

(22) Filed: May 29, 2024

(65) Prior Publication Data

US 2024/0308348 A1     Sep. 19, 2024

Related U.S. Application Data

(63) Continuation of application No. PCT/CN2021/134617, filed on Nov. 30, 2021.

(51) Int. Cl.
| | |
|---|---|
| *B60L 3/00* | (2019.01) |
| *A62C 3/07* | (2006.01) |
| *B60L 53/60* | (2019.01) |
| *B60L 53/80* | (2019.01) |
(Continued)

(52) U.S. Cl.
CPC .............. *B60L 3/0046* (2013.01); *A62C 3/07* (2013.01); *B60L 53/60* (2019.02); *B60L 53/80* (2019.02); *B60L 58/10* (2019.02); *G08B 21/185* (2013.01); *B60L 2240/54* (2013.01)

(58) Field of Classification Search
CPC ........ B60L 3/0046; B60L 53/60; B60L 58/10; B60L 53/80; B60L 2240/54; A62C 3/07; G08B 21/185
See application file for complete search history.

(56) References Cited

U.S. PATENT DOCUMENTS

| | | | | |
|---|---|---|---|---|
| 5,832,396 | A * | 11/1998 | Moroto ................... | B60L 50/16 |
| | | | | 701/410 |
| 7,313,825 | B2 * | 12/2007 | Redlich ............... | G06F 21/6245 |
| | | | | 713/193 |

(Continued)

FOREIGN PATENT DOCUMENTS

| | | |
|---|---|---|
| CN | 107611513 A | 1/2018 |
| CN | 108711893 A | 10/2018 |
(Continued)

*Primary Examiner* — Gertrude Arthur Jeanglaude
(74) *Attorney, Agent, or Firm* — Conley Rose, P.C.

(57) ABSTRACT

A battery safety warning method includes: when determining battery warning information of a target vehicle, a battery warning system first obtains N performance values of a target vehicle battery, and then determines battery warning information that has a preset mapping relationship with each of the N performance values as battery warning information of the target vehicle. After the battery warning information of the target vehicle is determined, target processing policy information can be sent to a target processing device based on mapping relationships between different safety warning levels and processing policies corresponding to different processing devices. Correspondingly, after receiving the target processing policy information, the target processing device may perform a corresponding operation according to an indication of the target processing policy information.

20 Claims, 11 Drawing Sheets

(51) Int. Cl.
    *B60L 58/10*        (2019.01)
    *G08B 21/18*       (2006.01)

(56)                 References Cited

U.S. PATENT DOCUMENTS

| | | | |
|---|---|---|---|
| 7,362,239 B2 * | 4/2008 | Franczyk | G08G 1/096791 |
| | | | 340/936 |
| 8,952,823 B2 * | 2/2015 | Xie | G01R 31/382 |
| | | | 340/636.11 |
| 9,177,466 B2 * | 11/2015 | Xie | G08B 29/181 |
| 2012/0188086 A1 * | 7/2012 | Xie | G01R 31/382 |
| | | | 340/636.18 |
| 2013/0135110 A1 | 5/2013 | Xie et al. | |
| 2016/0032188 A1 | 2/2016 | Furusato et al. | |
| 2019/0299803 A1 | 10/2019 | Cheng et al. | |

FOREIGN PATENT DOCUMENTS

| | | | |
|---|---|---|---|
| CN | 109786872 A | 5/2019 | |
| CN | 110311179 A | 10/2019 | |
| CN | 110783656 A | 2/2020 | |
| CN | 111260875 A | 6/2020 | |
| CN | 111381169 A | 7/2020 | |
| CN | 111391668 A | 7/2020 | |
| CN | 112092675 A | 12/2020 | |
| CN | 112345943 A | 2/2021 | |
| CN | 112356674 A | 2/2021 | |
| CN | 112886082 A | 6/2021 | |
| CN | 112993426 A | 6/2021 | |
| JP | 6435874 B2 | 12/2018 | |
| WO | 2020019578 A1 | 1/2020 | |

* cited by examiner

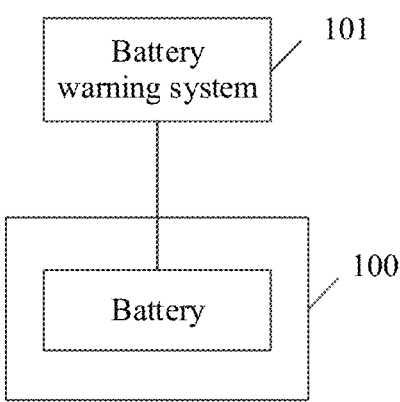

FIG. 1

S201: Obtain N performance values of a target battery in a target vehicle in a target period of time, where the N performance values are in a one-to-one correspondence with N performances of the vehicle battery, the N performances include M performances of the following performances: a voltage deviation descent speed, an insulation descent speed, a voltage difference at rest, an insulation average level, a cycle average temperature, and a cycle temperature rise rate, M is a positive integer, and N is a positive integer greater than or equal to M S202: Determine battery warning information that has a preset mapping relationship with each of the N performance values as battery warning information of the target vehicle

FIG. 2

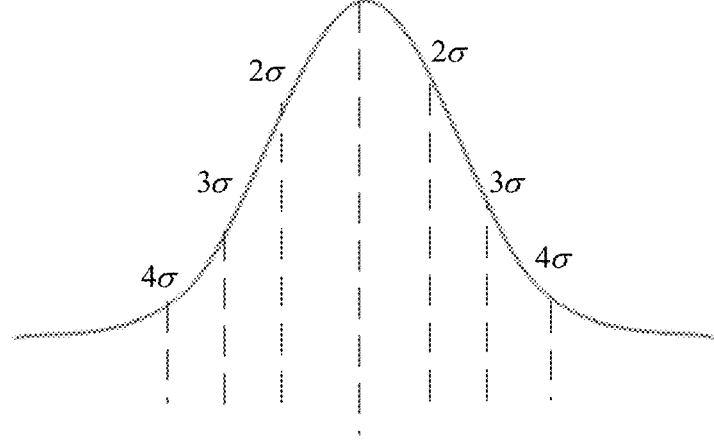

FIG. 3

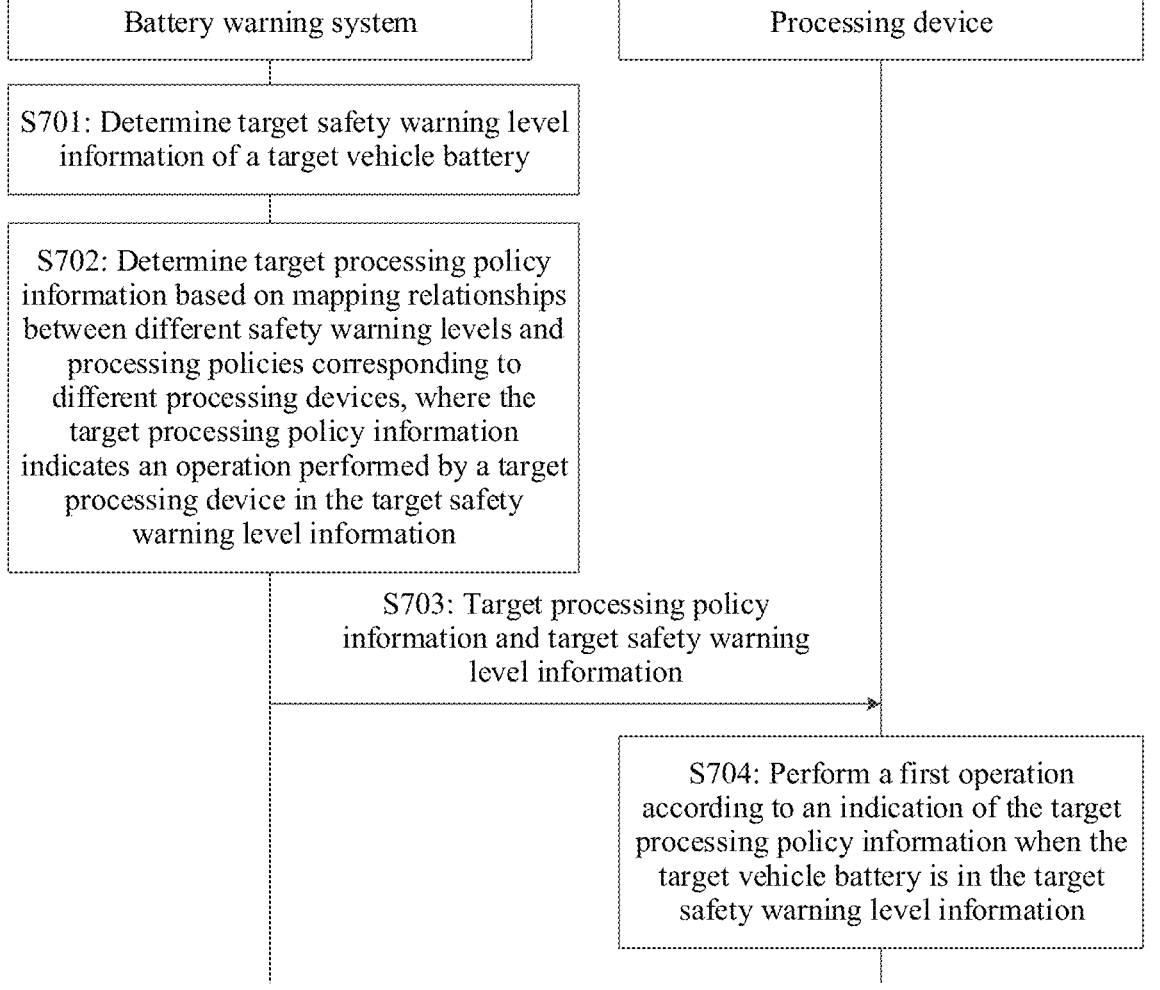

Battery warning system

S701: Determine target safety warning level information of a target vehicle battery S702: Determine target processing policy information based on mapping relationships between different safety warning levels and processing policies corresponding to different processing devices, where the target processing policy information indicates an operation performed by a target processing device in the target safety warning level information S703: Target processing policy information and target safety warning level information Processing device S704: Perform a first operation according to an indication of the target processing policy information when the target vehicle battery is in the target safety warning level information

FIG. 7

BATTERY SAFETY WARNING METHOD AND APPARATUS

CROSS-REFERENCE TO RELATED APPLICATIONS

This is a continuation of International Patent Application No. PCT/CN2021/134617 filed on Nov. 30, 2021, the disclosure of which is hereby incorporated by reference in its entirety.

TECHNICAL FIELD

Embodiments of the present disclosure relate to the field of intelligent automobile technologies, and more specifically, to a battery safety warning method and apparatus.

BACKGROUND

In recent years, in the environment of energy saving and emission reduction, electric vehicles have developed rapidly in China. However, with the rapid development of electric vehicles, spontaneous combustion events of the electric vehicles also gradually increase, which usually leads to safety accidents of car crashes and deaths. Researches show that most of the causes of spontaneous combustion of electric vehicles are related to thermal runaway of batteries in the electric vehicles. Therefore, a safety warning for a battery in an electric vehicle becomes a research focus.

Currently, there are mainly two manners of a safety warning for a battery in an electric vehicle. In the first implementation, because the battery has characteristics such as smoke, gas emission, and increased pressure in the battery at an initial stage of thermal runaway, a sensor is added to the electric vehicle to detect characteristics such as smoke, gas, and pressure of the battery, so as to recognize an early thermal runaway phenomenon, thereby implementing a safety warning for the battery. In the second implementation, a voltage threshold or a temperature threshold is set in a battery management system (BMS) of the electric vehicle, and then an alarm is triggered when a voltage value of the battery reaches the voltage threshold or a temperature value of the battery reaches the temperature threshold, so as to implement a safety warning for the battery.

However, in the first implementation, the initial stage of thermal runaway of the battery is usually quite short, in time, to a time of spontaneous combustion of the electric vehicle. For example, a time interval from smoke and gas emission of the battery to spontaneous combustion of the electric vehicle may be only a dozen minutes. Therefore, accuracy of a safety warning can be ensured by recognizing an early thermal runaway phenomenon by using the sensor. However, a safety warning time is also quite late due to a problem of a quite short time interval. However, in the second implementation, if the voltage value of the battery reaches the voltage threshold or the temperature value of the battery reaches the temperature threshold, it does not mean that thermal runaway necessarily occurs on the battery. Therefore, when the voltage value or the temperature value is used to perform the battery safety warning, although it can be ensured that the safety warning is performed in advance, accuracy of the safety warning cannot be ensured.

Therefore, how to improve accuracy of the safety warning becomes a technical problem that urgently needs to be resolved.

SUMMARY

Embodiments of the present disclosure provide a battery safety warning method and apparatus, to improve accuracy of battery safety warning.

According to a first aspect, an embodiment of the present disclosure provides a battery safety warning method, including: receiving target processing policy information and target safety warning level information; and performing, by a target processing device, a first operation according to an indication of the target processing policy information when a target vehicle battery is in the target safety warning level information.

In this embodiment, the target processing device may implement the first operation on the target vehicle battery based on the indication of the target processing policy information. In other words, a device (a battery warning system) that sends the target processing policy information and the target safety warning level information may share, with the target processing device, information about a same target vehicle battery and information about how the target processing device should process the target vehicle battery in the target safety warning level information, so that the target processing device and the battery warning system can share information about a same battery.

For example, the target safety warning level information is any one of the following: level-1 warning information, level-2 warning information, and level-3 warning information. The target processing device includes at least one of the following: a target vehicle, a target charging pile, a target battery swap station, and a target mobile phone.

With reference to the first aspect, in an implementable manner, the target safety warning level information is the level-1 warning information, and the target processing policy information includes the following information: turning on a warning light by the target vehicle; and correspondingly, the performing, by a target processing device, a first operation according to an indication of the target processing policy information when a target vehicle battery is in the target safety warning level information includes: performing, by the target vehicle, an operation of turning on the warning light.

In this implementation, when the target vehicle receives the level-1 warning information and the target processing policy information about turning on the warning light by the target vehicle, the target vehicle may perform an operation of turning on the warning light, so as to implement a safety warning for the vehicle battery.

With reference to the first aspect, in an implementable manner, the target processing policy information further includes the following information: limiting a charging power of the target vehicle battery by the target charging pile; and correspondingly, the performing, by a target processing device, a first operation according to an indication of the target processing policy information when a target vehicle battery is in the target safety warning level information further includes: when the target vehicle is swapping a battery by using the target charging pile, performing, by the target charging pile, an operation of limiting the charging power of the target vehicle battery.

In this implementation, the target processing policy information determined by the battery warning system may further include limiting the charging power of the target vehicle battery by the target charging pile. In this case, if the target vehicle is being charged by using the target charging pile, the battery warning system may further send, to the target charging pile, the target processing policy information about limiting the charging power of the target vehicle battery by the target charging pile. In this case, the target charging pile may perform an operation of limiting the charging power of the target vehicle battery, to implement a safety warning for the vehicle battery.

With reference to the first aspect, in an implementable manner, the target processing policy information further includes the following information: limiting the charging power of the target vehicle battery by the target battery swap station; and correspondingly, the performing, by a target processing device, a first operation according to an indication of the target processing policy information when a target vehicle battery is in the target safety warning level information further includes: when the target vehicle is swapping a battery by using the target battery swap station, performing, by the target battery swap station, an operation of limiting the charging power of the target vehicle battery.

In this implementation, the target processing policy information determined by the battery warning system may further include limiting the charging power of the target vehicle battery by the target battery swap station. In this case, if the target vehicle is swapping a battery by using the target battery swap station, the battery warning system may further send, to the target battery swap station, the target processing policy information about limiting the charging power of the target vehicle battery by the target battery swap station. In this case, the target battery swap station may perform an operation of limiting the charging power of the target vehicle battery, to implement a safety warning for the vehicle battery.

With reference to the first aspect, in an implementable manner, when the target safety warning level information is the level-2 warning information, the target processing policy information includes at least one piece of the following information: turning on a warning light by the target vehicle, and limiting a use power of the target vehicle battery based on a message prompt of the target vehicle; and correspondingly, the performing, by a target processing device, a first operation according to an indication of the target processing policy information when a target vehicle battery is in the target safety warning level information includes: performing, by the target vehicle, at least one of the following operations: turning on the warning light by the target vehicle, and limiting the use power of the target vehicle battery based on the message prompt of the target vehicle.

For example, when the target safety warning level information is the level-2 warning information, compared with the level-1 warning information, a battery of the target vehicle corresponding to the level-2 warning information is less safe than a battery of the target vehicle corresponding to the level-1 warning information. Therefore, in this implementation, when the battery warning information determines the target processing policy information of the target vehicle, the level-2 warning information corresponds to more target processing policy information of the target vehicle than the target processing policy information of the target vehicle corresponding to the level-1 warning information, for example, at least one of turning on the warning light by the target vehicle and limiting the use power of the target vehicle battery based on the message prompt of the target vehicle. Correspondingly, when the target vehicle receives the level-2 warning information and the target processing policy, the target vehicle may perform operations of turning on the warning light and limiting the use power of the target vehicle battery based on the message prompt of the target vehicle, so as to implement a safety warning for the vehicle battery.

With reference to the first aspect, in a possible implementation, the target processing policy information further includes at least one piece of the following information: limiting a charging power of the target vehicle by the target charging pile, and limiting a charging upper limit of the target charging pile; and correspondingly, the performing, by a target processing device, a first operation according to an indication of the target processing policy information when a target vehicle battery is in the target safety warning level information further includes: when the target vehicle is being charged by using the target charging pile, performing, by the target charging pile, at least one of the following operations: limiting the charging power of the target vehicle, and limiting the charging upper limit.

In this implementation, when the target safety warning level information is the level-2 warning information, the target processing policy information determined by the battery warning system may further include at least one of the following: limiting the charging power of the target vehicle, and limiting the charging upper limit. In this case, if the target vehicle is being charged by using the target charging pile, the battery warning system may further send the at least one piece of target processing policy information to the target charging pile. In this case, the target charging pile may perform at least one operation of limiting the charging power of the target vehicle and limiting the charging upper limit, to implement a safety warning for the vehicle battery.

With reference to the first aspect, in a possible implementation, the target processing policy information further includes at least one piece of the following information: limiting a charging power of the target vehicle battery by the target battery swap station, limiting a charging upper limit by the target battery swap station, and starting an after-sales procedure of the target vehicle battery; and correspondingly, the performing, by a target processing device, a first operation according to an indication of the target processing policy information when a target vehicle battery is in the target safety warning level information further includes: when the target vehicle is swapping a battery by using the target battery swap station, performing, by the target battery swap station, at least one of the following operations: limiting the charging power of the target vehicle battery, limiting the charging upper limit, and starting the after-sales procedure of the target vehicle battery.

In this implementation, when the target safety warning level information is the level-2 warning information, the target processing policy information determined by the battery warning system may further include at least one of the following operations: limiting the charging power of the target vehicle battery by the target battery swap station, limiting the charging upper limit by the target battery swap station, and starting the after-sales procedure of the target vehicle battery. In this case, if the target vehicle is swapping a battery by using the target battery swap station, the battery warning system may further send the target processing policy information of the at least one of the foregoing operations to the target battery swap station. In this case, the target battery swap station may perform at least one of the following operations: limiting the charging power of the target vehicle battery, limiting the charging upper limit, and starting the after-sales procedure of the target vehicle battery, so as to implement a safety warning for the vehicle battery.

With reference to the first aspect, in a possible implementation, the target processing policy information further includes at least one piece of the following information:

providing fault prompt information by the target mobile phone, and displaying a processing suggestion by the target mobile phone; and correspondingly, the performing, by a target processing device, a first operation according to an indication of the target processing policy information when a target vehicle battery is in the target safety warning level information further includes: performing, by the target mobile phone, at least one of the following operations: providing the fault prompt information and displaying the processing suggestion.

In this implementation, when the target safety warning level information is the level-2 warning information, the target processing policy information determined by the battery warning system may further include at least one piece of the following information: providing the fault prompt information by the target mobile phone, and displaying the processing suggestion by the target mobile phone. Further, the battery warning system may further send the target processing policy information to the target mobile phone. In this case, the target mobile phone may perform at least one of the following operations: providing the fault prompt information and displaying the processing suggestion, to implement a safety warning for the vehicle battery.

With reference to the first aspect, in an implementable manner, when the target safety warning level information is the level-3 warning information, the target processing policy information includes at least one piece of the following information: turning on a warning light by the target vehicle, and issuing a voice alarm by the target vehicle; and correspondingly, the performing, by a target processing device, a first operation according to an indication of the target processing policy information when a target vehicle battery is in the target safety warning level information includes: performing, by the target vehicle, at least one of the following operations: turning on the warning light and issuing the voice alarm.

For example, in this implementation, when the target safety warning level information is the level-3 warning information, compared with the level-2 warning information, a battery of the target vehicle corresponding to the level-3 warning information is less safe than a battery of the target vehicle corresponding to the level-2 warning information. Therefore, in this implementation, when the battery warning information determines the target processing policy information of the target vehicle, the level-2 warning information corresponds to more target processing policy information of the target vehicle than the target processing policy information of the target vehicle corresponding to the level-2 warning information, for example, including at least one piece of the following information: turning on the warning light by the target vehicle, and issuing the voice alarm by the target vehicle. Correspondingly, when the target vehicle receives the level-3 warning information and the target processing policy, the target vehicle may perform an operation of turning on the warning light and issuing the voice alarm, to implement a safety warning for the vehicle battery.

Optionally, when the target vehicle is traveling or a current vehicle speed of the target vehicle is not 0, the target processing policy information further includes at least one piece of the following information: limiting a use power of the target vehicle battery by the target vehicle, and reminding, by the target vehicle, a user to safely park and leave the target vehicle; and correspondingly, the target vehicle further performs at least one of the following operations:

limiting the use power of the target vehicle battery, and reminding the user to safely park and leave the target vehicle.

Optionally, when the target vehicle does not travel or a current vehicle speed of the target vehicle is 0, the target processing policy information further includes at least one piece of the following information: unlocking a vehicle door by the target vehicle, and reminding, by the target vehicle in voice, a user to leave the target vehicle and start a fire extinguishing program of the target vehicle; and correspondingly, the target vehicle further performs at least one of the following operations: unlocking the vehicle door by the target vehicle, and reminding, by the target vehicle in voice, the user to leave the target vehicle and start the fire extinguishing program of the target vehicle.

With reference to the first aspect, in a possible implementation, the target processing policy information further includes at least one piece of the following information: stopping, by the charging pile, charging the target vehicle battery, and notifying, by the target charging pile in voice, the user to start a fire processing procedure of the charging station; and correspondingly, the performing, by a target processing device, a first operation according to an indication of the target processing policy information when a target vehicle battery is in the target safety warning level information further includes: when the target vehicle is being charged by using the target charging pile, performing, by the target charging pile, at least one of the following operations: stopping charging the target vehicle battery, and notifying, in voice, the user to start the fire processing procedure of the charging station.

In this implementation, when the target safety warning level information is the level-3 warning information, the target processing policy information determined by the battery warning system may further include at least one of the following: stopping, by the charging pile, charging the target vehicle battery, and notifying, by the target charging pile in voice, the user to start the fire processing procedure of the charging station. In this case, if the target vehicle is being charged by using the target charging pile, the battery warning system may further send the at least one piece of target processing policy information to the target charging pile. In this case, the target charging pile may perform at least one of the following operations: stopping charging the target vehicle battery, and notifying, in voice, the user to start the fire processing procedure of the charging station, so as to implement a safety warning for the vehicle battery.

With reference to the first aspect, in a possible implementation, the target processing policy information further includes at least one piece of the following information: rejecting, by the target charging pile, to charge the target vehicle battery, and notifying, by the target charging pile in voice, the user to start a fire processing procedure of the charging station; and correspondingly, the performing, by a target processing device, a first operation according to an indication of the target processing policy information when a target vehicle battery is in the target safety warning level information further includes: when the target vehicle is to be charged by using the target charging pile, performing, by the target charging pile, at least one of the following operations: rejecting to charge the target vehicle battery, and notifying, in voice, the user to start the fire processing procedure of the charging station.

In this implementation, when the target safety warning level information is the level-3 warning information, the target processing policy information determined by the battery warning system may further include at least one of the following: rejecting, by the target charging pile, to charge the target vehicle battery, and notifying, by the target charging pile in voice, the user to start the fire processing procedure of the charging station. In this case, if the target vehicle is to be charged by using the target charging pile, the battery warning system may further send the at least one piece of target processing policy information to the target charging pile. In this case, the target charging pile may perform at least one of the following operations: rejecting to charge the target vehicle battery, and notifying, in voice, the user to start the fire processing procedure of the charging station, to implement a safety warning for the vehicle battery.

With reference to the first aspect, in a possible implementation, the target processing policy information further includes at least one piece of the following information: stopping, by the target battery swap station, charging the target vehicle battery, and notifying, by the target battery swap station in voice, the user to start a fire processing procedure of the charging station; and correspondingly, the performing, by a target processing device, a first operation according to an indication of the target processing policy information when a target vehicle battery is in the target safety warning level information further includes: when the target vehicle is being charged by using the target battery swap station, performing, by the target battery swap station, at least one of the following operations: stopping charging the target vehicle battery, and notifying, in voice, the user to start the fire processing procedure of the charging station.

In this implementation, when the target safety warning level information is the level-3 warning information, the target processing policy information determined by the battery warning system may further include at least one of the following: stopping, by the target battery swap station, charging the target vehicle battery, and notifying, by the target battery swap station in voice, the user to start the fire processing procedure of the charging station. In this case, if the target vehicle is being charged by using the target battery swap station, the battery warning system may further send the at least one piece of target processing policy information to the target battery swap station. In this case, the target battery swap station may perform at least one of the following operations: stopping charging the target vehicle battery, and notifying, in voice, the user to start the fire processing procedure of the charging station, so as to implement a safety warning for the vehicle battery.

With reference to the first aspect, in a possible implementation, the target processing policy information further includes at least one piece of the following information: rejecting, by the target battery swap station, to charge the target vehicle battery, and notifying, by the target battery swap station in voice, the user to start a fire processing procedure of the charging station; and correspondingly, the performing, by a target processing device, a first operation according to an indication of the target processing policy information when a target vehicle battery is in the target safety warning level information further includes: when the target vehicle is to swap a battery by using the target battery swap station, performing, by the target battery swap station, at least one of the following operations: rejecting to charge the target vehicle battery, and notifying, in voice, the user to start the fire processing procedure of the charging station.

In this implementation, when the target safety warning level information is the level-3 warning information, the target processing policy information determined by the battery warning system may further include at least one of the following: rejecting, by the target battery swap station, to charge the target vehicle battery, and notifying, by the target battery swap station in voice, the user to start the fire processing procedure of the charging station. In this case, if the target vehicle is to be charged by using the target battery swap station, the battery warning system may further send the at least one piece of target processing policy information to the target battery swap station. In this case, the target battery swap station may perform at least one of the following operations: rejecting to charge the target vehicle battery, and notifying, in voice, the user to start the fire processing procedure of the charging station, so as to implement a safety warning for the vehicle battery.

With reference to the first aspect, in a possible implementation, the target processing policy information further includes at least one piece of the following information: issuing a voice alarm, a short message service message alarm, and a message alarm by the target mobile phone, and reminding the user to leave the target vehicle; and correspondingly, the performing, by a target processing device, a first operation according to an indication of the target processing policy information when a target vehicle battery is in the target safety warning level information further includes: performing, by the target mobile phone, at least one of the following operations: issuing the voice alarm, the short message service message alarm, and the message alarm, and reminding the user to leave the target vehicle.

In this implementation, when the target safety warning level information is the level-2 warning information, the target processing policy information determined by the battery warning system may further include at least one piece of the following information: issuing the voice alarm, the short message service message alarm, and the message alarm by the target mobile phone, and reminding the user to leave the target vehicle. Further, the battery warning system may further send the target processing policy information to the target mobile phone. In this case, the target mobile phone may perform at least one of the following operations: issuing the voice alarm, the short message service message alarm, and the message alarm, and reminding the user to leave the target vehicle, so as to implement a safety warning for the vehicle battery.

According to a second aspect, an embodiment of the present disclosure provides a battery safety warning method, including: determining target safety warning level information of a target vehicle battery; determining target processing policy information based on mapping relationships between different safety warning levels and processing policies corresponding to different processing devices, where the target processing policy information indicates an operation performed by a target processing device in the target safety warning level information; and sending the target processing policy information and the target safety warning level information to the target processing device.

For example, the target safety warning level information is any one of the following: level-1 warning information, level-2 warning information, and level-3 warning information, and the target processing device includes at least one of the following: a target vehicle, a target charging pile, a target battery swap station, and a target mobile phone.

With reference to the second aspect, in a possible implementation, when the target safety warning level information is the level-1 warning information, the determining target processing policy information includes: determining that the target processing policy information includes the following information: turning on a warning light by the target vehicle.

With reference to the second aspect, in a possible implementation, when the target vehicle is being charged by using the target charging pile, the determining target processing policy information includes: determining that the target processing policy information further includes the following information: limiting a charging power of the target vehicle battery by the target charging pile.

With reference to the second aspect, in a possible implementation, when the target vehicle is swapping a battery by using the target battery swap station, the determining target processing policy information includes: determining that the target processing policy information further includes the following information: limiting the charging power of the target vehicle battery by the target battery swap station.

With reference to the second aspect, in a possible implementation, when the target safety warning level information is the level-2 warning information, the determining target processing policy information includes: determining that the target processing policy information includes at least one piece of the following information: turning on a warning light by the target vehicle, and limiting a use power of the target vehicle battery based on a message prompt of the target vehicle.

With reference to the second aspect, in a possible implementation, when the target vehicle is being charged by using the target charging pile, the determining target processing policy information includes: determining that the target processing policy information further includes at least one piece of the following information: limiting a charging power of the target vehicle by the target charging pile, and limiting a charging upper limit of the target charging pile.

With reference to the second aspect, in a possible implementation, when the target vehicle is swapping a battery by using the target battery swap station, the determining target processing policy information includes: determining that the target processing policy information further includes at least one piece of the following information: limiting a charging power of the target vehicle battery by the target battery swap station, limiting a charging upper limit by the target battery swap station, and starting an after-sales procedure of the target vehicle battery.

With reference to the second aspect, in a possible implementation, the determining target processing policy information further includes: determining that the target processing policy information further includes at least one piece of the following information: providing fault prompt information by the target mobile phone, and displaying a processing suggestion by the target mobile phone.

With reference to the second aspect, in a possible implementation, when the target safety warning level information is the level-3 warning information, the determining target processing policy information includes: determining that the target processing policy information includes at least one piece of the following information: turning on a warning light by the target vehicle, and issuing a voice alarm by the target vehicle.

With reference to the second aspect, in a possible implementation, when the target vehicle is traveling or a current vehicle speed of the target vehicle is not 0, the determining target processing policy information includes: determining that the target processing policy information further includes at least one piece of the following information: limiting a use power of the target vehicle battery by the target vehicle, and reminding, by the target vehicle, a user to safely park and leave the target vehicle.

With reference to the second aspect, in a possible implementation, when the target vehicle does not travel or a current vehicle speed of the target vehicle is 0, the determining target processing policy information includes: determining that the target processing policy information further includes at least one piece of the following information: unlocking a vehicle door by the target vehicle, and reminding, by the target vehicle in voice, a user to leave the target vehicle and start a fire extinguishing program of the target vehicle.

With reference to the second aspect, in a possible implementation, when the target vehicle is being charged by using the target charging pile, the determining target processing policy information includes: determining that the target processing policy information further includes at least one piece of the following information: stopping, by the target charging pile, charging the target vehicle battery, and notifying, by the target charging pile in voice, the user to start a fire processing procedure of the charging station.

With reference to the second aspect, in a possible implementation, when the target vehicle is to be charged by using the target charging pile, the determining target processing policy information includes: determining that the target processing policy information further includes at least one piece of the following information: rejecting, by the target charging pile, to charge the target vehicle battery, and notifying, by the target charging pile in voice, the user to start a fire processing procedure of the charging station.

With reference to the second aspect, in a possible implementation, when the target vehicle is being charged by using the target battery swap station, the determining target processing policy information includes: determining that the target processing policy information further includes at least one piece of the following information: stopping, by the target battery swap station, charging the target vehicle battery, and notifying, by the target battery swap station in voice, the user to start a fire processing procedure of the charging station.

With reference to the second aspect, in a possible implementation, when the target vehicle is to swap a battery by using the target battery swap station, the determining target processing policy information includes: determining that the target processing policy information further includes at least one piece of the following information: rejecting, by the target battery swap station, to charge the target vehicle battery, and notifying, by the target battery swap station in voice, the user to start a fire processing procedure of the charging station.

With reference to the second aspect, in a possible implementation, the determining target processing policy information further includes: determining that the target processing policy information further includes at least one piece of the following information: issuing a voice alarm, a short message service message alarm, and a message alarm by the target mobile phone, and reminding the user to leave the target vehicle.

According to a third aspect, the present disclosure provides a battery warning method, applied to a battery warning system, where the method includes: obtaining N performance values of a target vehicle battery, where the N performance values are in a one-to-one correspondence with N performances of the target vehicle battery, the N performances include M performances of the following performances: a voltage deviation descent speed, an insulation descent speed, a voltage difference at rest, an insulation average level, a cycle average temperature, and a cycle temperature rise rate, M is a positive integer, and N is a positive integer greater than or equal to M; and determining battery warning information that has a preset mapping relationship with each of the N performance values as battery warning information of a target vehicle.

In this embodiment, the battery warning information that has the preset mapping relationship with each of the N performance values is determined as the battery warning information of the target vehicle. To be specific, the battery warning information of the target vehicle is determined based on the N performance values of the target battery, and the N performance values are in a one-to-one correspondence with the N performance values of the target battery. In this case, if N is greater than 1, that is, the obtained parameters used to describe the performance of the target battery are more comprehensive. In addition, because the obtained information is a parameter that can be used to describe thermal runaway of the target battery, compared with obtaining only a voltage performance parameter or a temperature performance parameter of the battery, the performance that is of the target battery and that is obtained in this embodiment of the present disclosure can reflect a thermal runaway status of the target battery more deeply. Therefore, regardless of whether N is equal to 1 or greater than 1, accuracy of a safety warning for the battery can be improved.

With reference to the third aspect, in a possible implementation, the determining battery warning information that has a preset mapping relationship with each of the N performance values as battery warning information of the target vehicle includes: determining, based on a preset mapping relationship between a value of each of the N performances and a value interval to which the value belongs, a performance value interval to which a performance value corresponding to each of the N performances belongs; and determining battery warning information that has a preset mapping relationship with the performance value interval to which each of the N performance values belongs as the battery warning information of the target vehicle.

In this implementation, the battery warning information that has the preset mapping relationship with the performance value interval to which each of the N performance values belongs is determined as the battery warning information of the target vehicle. To be specific, when the battery warning information of the target vehicle is determined, N value intervals are considered, and the N value intervals are in a one-to-one correspondence with the N performances. Therefore, the battery warning information of the target vehicle can be determined more accurately.

With reference to the third aspect, in a possible implementation, the value interval to which the value of each performance belongs is obtained by dividing a preset value range of each performance based on a warning threshold corresponding to each performance, and the warning threshold corresponding to each performance and a plurality of historical values of each performance satisfy a mapping relationship.

In this embodiment, the warning threshold corresponding to each performance is not selected based on experience, but is in a mapping relationship with the plurality of historical values of each performance. Therefore, the selected warning threshold is more accurate, and further, a warning interval obtained through division by using the warning threshold is more accurate, to further improve accuracy of a safety warning for the battery.

With reference to the third aspect, in a possible implementation, the determining battery warning information that has a preset mapping relationship with the performance value interval of each of the N performance values as the battery warning information of the target vehicle includes: determining, based on a preset mapping relationship between the value interval of each of the N performances and a warning level classified for each performance, a warning level corresponding to the performance value corresponding to each performance in the N performance values; and determining battery warning information that has a preset mapping relationship with each of N warning levels that are in a one-to-one correspondence with the N performance values as the battery warning information of the target vehicle.

In this implementation, warning levels may be further divided for different value intervals, that is, mapping relationships between different value intervals and warning levels are determined. Then, when the battery warning information that has the preset mapping relationship with each of the N performance values is determined as the battery warning information of the target vehicle, only the battery warning information that has the preset mapping relationship with each of the N warning levels that are in a one-to-one correspondence with the N performance values needs to be determined as the battery warning information of the target vehicle. In this manner, because the warning level can reflect impact of the value interval on a safety degree of the battery, for the battery warning system, a degree of impact of the performance on the safety degree of the battery may be more quickly determined by using a warning level corresponding to a performance.

With reference to the third aspect, in a possible implementation, the battery warning information of the target vehicle includes at least one piece of the following warning information: level-1 warning information, level-2 warning information, and level-3 warning information.

With reference to the third aspect, in a possible implementation, the level-1 warning information indicates that the target vehicle can continue to be used, the level-2 warning information indicates that a function fault maintenance operation needs to be performed on the target vehicle, and the level-3 warning information indicates that an emergency processing operation needs to be performed on the target vehicle.

With reference to the third aspect, in a possible implementation, the battery warning system stores mapping relationships between different safety warning levels and processing policies corresponding to different processing devices, and the method further includes: obtaining, from the mapping relationships, a target processing policy corresponding to a target processing device in the battery warning information of the target vehicle; and sending target processing policy information and target safety warning level information to the target processing device.

For example, the target processing device includes one of the following: the target vehicle, a target charging pile, a target battery swap station, and a target mobile phone.

In this implementation, the battery warning system may automatically allocate processing measures based on different safety warning levels, so that it can be ensured that processing measures for a same vehicle and a same battery are proper and consistent between different processing devices.

According to a fourth aspect, the present disclosure provides a processing device, where the processing device includes modules configured to perform any one of the possible implementations of the first aspect.

According to a fifth aspect, an embodiment of the present disclosure provides a battery safety warning apparatus. The apparatus includes modules configured to perform the method according to the second aspect or any one of the possible implementations of the second aspect, and modules configured to perform the method according to the third aspect or any one of the possible implementations of the third aspect.

According to a sixth aspect, the present disclosure provides a battery safety warning apparatus, including a memory, a processor, and a transceiver, where the memory is configured to store a program instruction, and the processor is configured to invoke the program instruction in the memory to perform the method according to the first aspect or any one of the possible implementations of the first aspect.

In some embodiments, the apparatus may be a chip. In this implementation, optionally, the apparatus may further include a communication interface configured to communicate with another apparatus or device.

According to a seventh aspect, the present disclosure provides a battery warning system. The battery warning system includes the safety warning apparatus according to the second aspect, or the third aspect, or any one of the possible implementations of the second aspect or the third aspect.

According to an eighth aspect, the present disclosure provides a computer-readable storage medium, where the computer-readable medium stores a program instruction to be executed by a computer, and the program instruction is used to perform the method according to the first aspect or any one of the possible implementations of the first aspect, or the method according to the second aspect or any one of the possible implementations of the second aspect, or the method according to the third aspect or any one of the possible implementations of the third aspect.

According to a ninth aspect, the present disclosure provides a computer program product. The computer program product includes a computer program instruction, and when the computer program instruction is run on a computer, the computer is enabled to implement the method according to the first aspect or any one of the possible implementations of the first aspect, or implement the method according to the second aspect or any one of the possible implementations of the second aspect, or implement the method according to the third aspect or any one of the possible implementations of the third aspect.

For technical effects brought by any one of the implementations of the second aspect to the ninth aspect, refer to technical effects brought by any one of the possible implementations of the first aspect.

BRIEF DESCRIPTION OF DRAWINGS

FIG. 1 is a schematic diagram of an application scenario according to an embodiment of the present disclosure;

FIG. 2 is a schematic flowchart of a battery safety warning method according to an embodiment of the present disclosure;

FIG. 3 is a schematic diagram of a structure of a value interval according to an embodiment of the present disclosure;

FIG. 7 is a schematic flowchart of a battery safety warning method according to another embodiment of the present disclosure;

DESCRIPTION OF EMBODIMENTS

Figure 4:
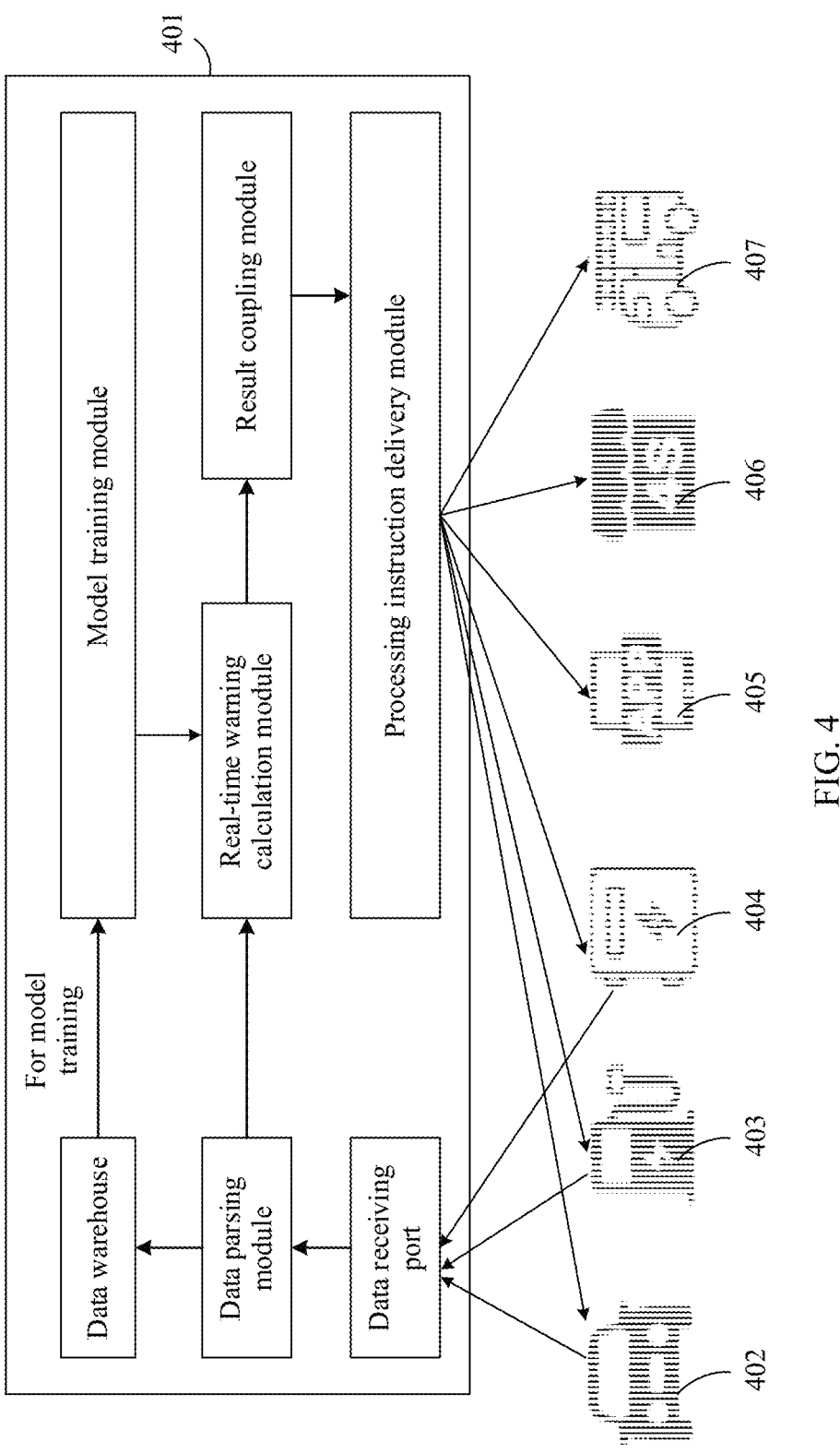
FIG. 4 is a schematic architectural diagram of a safety warning according to an embodiment of the present disclosure.

In recent years, in the environment of energy saving and emission reduction, electric vehicles have developed rapidly in China. However, with the rapid development of electric vehicles, spontaneous combustion events of the electric vehicles also gradually increase, which usually leads to safety accidents of car crashes and deaths. Researches show that most of the causes of spontaneous combustion of electric vehicles are related to thermal runaway of batteries in the electric vehicles. Therefore, a safety warning for a battery in an electric vehicle becomes a research focus.

FIG. 1 is a schematic diagram of an application scenario according to an embodiment of the present disclosure. As shown in FIG. 1, this scenario includes a vehicle 100 and a battery warning system 101.

The vehicle 100 includes a battery, and electric energy of the battery may drive the vehicle 100 to travel. Generally, the battery is mounted on a chassis of the vehicle 100. It may be understood that, in a battery charging and discharging process, thermal runaway may occur on the battery, causing the battery to catch fire, or even causing the entire vehicle to burn. As a result, a safety accident is caused.

Therefore, to reduce an occurrence rate of a vehicle-related safety accident, the battery warning system 101 is usually used to perform a safety warning on the battery in the vehicle 100. For example, when the safety warning system 101 determines that thermal runaway may occur immediately on the battery in the vehicle 100, an alarm in the vehicle 100 is triggered to issue an alarm, to ensure safety of the vehicle 100 and the battery in the vehicle 100.

It should be noted herein that a specific deployment manner of the battery warning system 101 in this embodiment of the present disclosure is not limited. For example, the battery warning system 101 may be deployed inside the vehicle 100, or may be deployed on a server, where the server includes a local server or a cloud server.

Currently, in the application scenario shown in FIG. 1, there are mainly two manners in which the battery warning system 101 performs a safety warning on the battery in the vehicle 100. In the first implementation, because the battery has characteristics such as smoke, gas emission, and increased pressure in the battery at an initial stage of thermal runaway, a sensor is added to the vehicle 100 to detect characteristics such as smoke, gas, and pressure of the battery in the vehicle 100, so as to recognize an early thermal runaway phenomenon. Then, after the early thermal runaway phenomenon is recognized, an alarm in the vehicle 100 may be triggered to issue an alarm, so as to implementing a safety warning for the battery. In the second implementation, a voltage threshold or a temperature threshold is set in a BMS of the vehicle 100, and then an alarm in the vehicle 100 is triggered to issue an alarm when a voltage value of the battery reaches the voltage threshold or a temperature value of the battery reaches the temperature threshold, so as to implement a safety warning for the battery.

However, in the first implementation, the initial stage of thermal runaway of the battery in the vehicle 100 is usually quite short, in time, to a time of spontaneous combustion of the vehicle 100. For example, a time interval from smoke and gas emission of the battery to spontaneous combustion of the vehicle 100 may be only a dozen minutes. Therefore, accuracy of a safety warning for the battery can be ensured by recognizing an early thermal runaway phenomenon by using the sensor. However, a safety warning time is also quite late due to a problem of a quite short time interval. For example, the safety warning is performed only after a thermal runaway phenomenon has occurred on a battery in the vehicle 100.

However, for the second implementation, if the voltage value of the battery in the vehicle 100 reaches the voltage threshold or the temperature value of the battery reaches the temperature threshold, it does not mean that thermal runaway necessarily occurs on the battery in the vehicle 100. For example, when the voltage of the battery in the vehicle 100 is detected for performing a warning, because a voltage change of the battery is relatively small when the thermal runaway occurs on the battery, the voltage change of the battery is confused with a voltage change of a normal battery, and it is difficult to distinguish. Therefore, when the voltage value or the temperature value is used to perform the safety warning, although it can be ensured that the safety warning is performed in advance, accuracy of the safety warning cannot be ensured.

In view of this, embodiments of the present disclosure provide a battery safety warning method and apparatus. In the method provided in the present disclosure, when determining battery warning information of a target vehicle, a battery warning system first obtains N performance values of a target vehicle battery, and then determines battery warning information that has a preset mapping relationship with each of the N performance values as the battery warning information of the target vehicle. In addition, after the battery warning information of the target vehicle is determined, target processing policy information can be sent to a target processing device based on mapping relationships between different safety warning levels and processing policies corresponding to different processing devices. Correspondingly, after receiving the target processing policy information, the target processing device may perform a corresponding operation according to an indication of the target processing policy information. In this technical solution, accuracy of a battery safety warning can be improved, and collaboration between the battery warning system and a plurality of target processing devices can be implemented.

FIG. 2 is a schematic flowchart of a battery safety warning method according to an embodiment of the present disclosure. As shown in FIG. 2, the method in this embodiment of the present disclosure includes S201 and S202. The method in the present disclosure may be performed by the battery warning system 101 in FIG. 1.

S201: Obtain N performance values of a target vehicle battery, where the N performance values are in a one-to-one correspondence with N performances of the target vehicle battery, the N performances include M performances of the following performances: a voltage deviation descent speed, an insulation descent speed, a voltage difference at rest, an insulation average level, a cycle average temperature, and a cycle temperature rise rate, M is a positive integer, and N is a positive integer greater than or equal to M.

The voltage deviation descent speed is a speed at which a voltage of the cell in the battery deviates from an average voltage of the cell in the battery when the vehicle is in a rest state in a particular period of time.

The rest state may be considered as a state of the vehicle when a current of the battery is limited within a range. For example, when the vehicle waits for traffic lights or the vehicle stops on the roadside, a corresponding battery current is quite small. In this case, it may be considered that the state of the vehicle when the vehicle waits for traffic lights or stops on the roadside is a rest state.

The insulation descent speed is a descent speed of an insulation level of the battery in a particular period of time when the vehicle is in a traveling state or a rest state, for example, the descent speed of the insulation level of the battery per hour.

The voltage difference at rest is a difference between a voltage of the cell in the battery when the vehicle is in a rest state and an average voltage of the cell in the battery when the vehicle is in a rest state. It should be noted herein that, how to obtain the average voltage of the cell in the battery is not limited in this embodiment. For example, in a possible implementation, voltage difference at rests of M vehicles may be obtained in total. The M vehicles belong to a same vehicle model and a same operation mode, and are all in a same region. Then, an average value of the obtained voltage difference at rests of the M vehicles is calculated, to obtain an average voltage of the cell in the battery in the rest state.

The insulation average level is an insulation average level of the battery in a particular period of time when the vehicle is in a traveling state or in a rest state.

The cycle average temperature is an average temperature of the battery of the vehicle in a particular period of time.

The cycle temperature rise rate is an average temperature rise rate used by the vehicle in a particular period of time.

It can be learned that if any one of the six performances: the voltage deviation descent speed, the insulation descent speed, the voltage difference at rest, the insulation average level, the cycle average temperature, and the cycle temperature rise rate is abnormal, a thermal runaway phenomenon of the battery may occur. Therefore, in the present disclosure, when the safety warning is performed on the target vehicle battery, performance values of any M performances in the foregoing six performances of the target vehicle battery may be obtained, for example, all performance values may be obtained, or the foregoing six performances may be sorted based on importance degrees that affect safety of the target battery, and then the first several relatively important performances are selected.

In addition, in this implementation, the obtained N performance values may alternatively be performance values corresponding to other performances of the target vehicle battery, that is, are not performance values of any one of the foregoing six performances, that is, N is greater than M. For example, a temperature value of the target vehicle battery may be further included. This is not limited in this embodiment of the present disclosure.

It should be noted herein that, for ease of description, the target vehicle battery is also referred to as a target battery in the present disclosure, and this does not constitute a limitation on embodiments of the present disclosure.

S202: Determine battery warning information that has a preset mapping relationship with each of the N performance values as battery warning information of the target vehicle.

The battery warning information is used to indicate a safety degree of the vehicle battery. For example, the battery warning information may be classified into levels. For example, when the battery warning information is level-1 warning information, it is considered that the vehicle battery is relatively safe and does not cause thermal runaway; when the battery warning information is level-2 warning information, it is considered that the vehicle battery may cause thermal runaway of the vehicle battery, and in this case, alarm information may be sent; and when the battery warning information is level-3 warning information, it is considered that the vehicle battery is quite unsafe and necessarily causes thermal runaway of the vehicle battery; and in this case, prompt information may also be sent to the user or the vehicle.

It may be understood that if any one of the voltage deviation descent speed, the insulation descent speed, the voltage difference at rest, the insulation average level, the cycle average temperature, and the cycle temperature rise rate is abnormal, a thermal runaway phenomenon of the battery may occur, that is, safety of the battery is affected. Whether a particular performance is abnormal may be reflected based on a performance value of the performance. Therefore, in this embodiment, pre-mapping relationships between the N performance values and the battery warning information may be stored in the battery warning information. Then, for the target vehicle battery, after the N performance values of the target battery are obtained, the battery warning information of the target vehicle in the target vehicle may be determined based on the pre-mapping relationships.

In an example, when N=1, that is, one performance value is obtained, and an example in which the obtained performance value is the cycle average temperature is used. It is assumed that the cycle average temperature when the battery is normal is 0 degrees Celsius to 40 degrees Celsius, and the cycle average temperature when the battery is abnormal is greater than 40 degrees Celsius. That is, when the cycle average temperature is in a range of 0 degrees Celsius to 40 degrees Celsius, it is considered that the battery is safe, and when the cycle average temperature is greater than 40 degrees Celsius, it is considered that the battery is unsafe. In this case, the following pre-mapping relationships may be stored in the battery warning system: If the cycle average temperature of the battery is in the range of 0 degrees Celsius to 40 degrees Celsius, corresponding battery warning information is a level-1 warning; or if the cycle average temperature of the battery is greater than 40 degrees Celsius, corresponding battery warning information is a level-2 warning. In this case, it is assumed that the cycle average temperature that is of the target battery of the target vehicle and that is obtained by the battery warning system is 60 degrees Celsius. In this case, it may be determined, based on the foregoing pre-mapping relationships stored in the battery warning system, that the battery warning information of the target battery is the level-1 warning. Further, prompt information may be output to the user or the vehicle, to prompt that the current safety warning information of the battery is the level-1 warning.

In another example, when N is greater than 1, that is, a plurality of performance values is obtained, and an example in which the obtained performance values are the cycle average temperature and cycle temperature rise rate is used. It is assumed that the cycle average temperature when the battery is normal is 0 degrees Celsius to 40 degrees Celsius, and the cycle average temperature when the battery is abnormal is greater than 40 degrees Celsius. That is, when the cycle average temperature is in a range of 0 degrees Celsius to 40 degrees Celsius, it is considered that the battery is safe, and when the cycle average temperature is greater than 40 degrees Celsius, it is considered that the battery is unsafe. For the cycle temperature rise rate, it is assumed that the cycle temperature rise rate when the battery is normal is less than 5 degrees Celsius per minute, and the cycle temperature rise rate when the battery is abnormal is greater than 5 degrees Celsius per minute. In this case, the following pre-mapping relationships may be stored in the battery warning system: If the cycle average temperature of the battery is in a range of 0 degrees Celsius to 40 degrees Celsius and the cycle temperature rise rate is less than 5 degrees Celsius per minute, corresponding battery warning information is the level-1 warning information; if the cycle average temperature of the battery is greater than 40 degrees Celsius or the cycle temperature rise rate is greater than 5 degrees Celsius per minute, corresponding battery warning information is the level-2 warning information; or if the cycle average temperature of the battery is greater than 40 degrees Celsius and the cycle temperature rise rate is greater than 5 degrees Celsius per minute, the corresponding battery warning information is the level-3 warning information. In this case, it is assumed that the cycle average temperature that is of the target battery of the target vehicle and that is obtained by the battery warning system is 60 degrees Celsius, and the cycle temperature rise rate is 10 degrees Celsius per minute. In this case, it may be determined, based on the foregoing pre-mapping relationships stored in the battery warning system, that the battery warning information of the target battery is the level-3 warning. Further, prompt information may be output to the user or the vehicle, to prompt that the current safety warning information of the battery is the level-3 warning, that is, the target battery in the target vehicle is quite unsafe.

For descriptions of the level-1 warning information, the level-2 warning information, and the level-3 warning information, refer to related descriptions in this embodiment. Details are not described again.

In this embodiment, because the battery warning information that has the preset mapping relationship with each of the N performance values is determined as the battery warning information of the target vehicle, that is, the battery warning information of the target vehicle is determined based on the N performances of the target battery. In this case, if N is greater than 1, it is equivalent to that the battery warning information of the target vehicle is no longer determined based on a single voltage or a single temperature, that is, the obtained performance parameters related to thermal runaway are more comprehensive. In addition, because the obtained information is a parameter that can be used to describe thermal runaway of the target battery, compared with obtaining only a voltage performance parameter or a temperature performance parameter of the battery, the performance that is of the target battery and that is obtained in this embodiment of the present disclosure can reflect a thermal runaway status of the target battery more deeply. Therefore, regardless of whether N is equal to 1 or greater than 1, accuracy of a safety warning for the battery can be improved.

In an optional embodiment, an implementable manner of S202 in the embodiment shown in FIG. 2 includes: determining, based on a preset mapping relationship between a value of each of the N performances and a value interval to which the value belongs, a performance value interval to which a performance value corresponding to each of the N performances belongs; and determining battery warning information that has a preset mapping relationship with the performance value interval to which each of the N performance values belongs as the battery warning information of the target vehicle.

It may be understood that each of the N performances may cause a thermal runaway phenomenon of the battery, and whether the performance of the battery is abnormal may be reflected based on a performance value of the performance. Generally, for a particular performance, battery performances corresponding to a plurality of performance values in a particular interval are usually approximately the same. Therefore, in this embodiment, for each performance, a mapping relationship between a value of each performance and a value interval may be specified. Then, for the N performances, when the battery warning information that has the preset mapping relationship with each of the N performance values is determined as the battery warning information of the target vehicle, only the battery warning information that has the preset mapping relationship with the performance value interval to which each of the N performance values belongs needs to be determined as the battery warning information of the target vehicle.

For example, the voltage difference at rest performance is used as an example. It is assumed that when the voltage difference at rest value is in two intervals: [−10,−5] and [5, 10], the voltage difference at rest has great impact on the battery, and when the voltage difference at rest value is in the intervals: [−5,−2] and [2, 5], corresponding battery performances are approximately the same. In this case, it may be determined that a mapping relationship between the value of the voltage difference at rest and the value interval is as follows: When the voltage difference at rest value is any value within [−10,−5], the corresponding value interval is [−10,−5]; when the voltage difference at rest value is any value within [5, 10], the corresponding value interval is [5, 10]; when the voltage difference at rest value is any value within [−5,−2], the corresponding value interval is [−5,−2]; and when the voltage difference at rest value is any value within [2, 5], the corresponding value interval is [2, 5].

When the mapping relationship between the value of each performance and the value interval is set, when a performance value of the target battery in a target period of time is obtained, the value interval to which the performance value belongs may be first obtained based on the set mapping relationship between the value of each performance and the value interval. Further, N value intervals are obtained for the N performance values.

In this embodiment, the battery warning information that has the preset mapping relationship with the performance value interval to which each of the N performance values belongs is determined as the battery warning information of the target vehicle. To be specific, when the battery warning information of the target vehicle is determined, N value intervals are considered, and the N value intervals are in a one-to-one correspondence with the N performances. Therefore, the battery warning information of the target vehicle can be determined more accurately.

In an optional embodiment, the value interval to which the value of each performance belongs is obtained by dividing a preset value range of each performance based on a warning threshold corresponding to each performance, the value interval to which the value of each performance belongs is obtained by dividing a preset value range of each performance based on a warning threshold corresponding to each performance, and the warning threshold corresponding to each performance and a plurality of historical values of each performance satisfy a mapping relationship.

It may be understood that, when the performance value interval to which each performance value of the N performances belongs is determined, the value interval should be provided first. However, the value interval is obtained through division based on a single value (referred to as a warning threshold in this embodiment). Therefore, when the value interval to which the value of each performance belongs is determined, the warning threshold should be first determined.

In this embodiment, the warning threshold corresponding to each performance is determined based on a mapping relationship between the warning threshold and a plurality of historical values of each performance.

In an example, a preset relationship is met between the warning threshold corresponding to each performance and a value of a parameter @ in a Gaussian distribution function that the plurality of historical values of each performance satisfy.

In this example, the value of a standard deviation σ in the Gaussian distribution function that the plurality of historical values of each performance satisfy is determined. That is, in this embodiment, the warning threshold corresponding to each performance and the standard deviation σ in the Gaussian distribution function that the plurality of historical values of the performance satisfy meet the preset relationship.

It should be noted herein that, how to obtain the plurality of historical values is not limited in this embodiment. For example, the obtained historical data may be historical data of a previous year, or may be historical data of a previous half year.

It may be understood that the Gaussian distribution function can generally describe distribution of most random variables. The Gaussian distribution function may be denoted as:

$$\frac{1}{\sqrt{2\pi}\sigma} e^{-\frac{(x-\mu)^2}{2\sigma^2}}$$

where σ represents the standard deviation, μ represents an average value, and X is a random variable.

It may be further understood that, to determine Gaussian distribution that each performance satisfies, σ and μ need to be determined.

In this embodiment, to determine σ and μ in the Gaussian distribution function corresponding to each performance, a plurality of historical values of each performance are obtained, and then the Gaussian distribution function is trained based on the plurality of historical values, so as to determine σ and μ.

Generally, because an actual distribution status of each of the N performances is more inclined to Gaussian distribution, in this embodiment, the warning threshold determined by using Gaussian distribution is more accurate.

For example, the preset relationship between the warning threshold corresponding to each performance and the value of the parameter σ in the Gaussian distribution function that the plurality of historical values of each performance satisfy is as follows: i*σ, where i is 2, 3, or 4. FIG. 3 is a schematic diagram of a structure of a value interval according to an embodiment of the present disclosure.

As shown in FIG. 3, a curve represents a Gaussian distribution function obtained through training based on a plurality of historical values. FIG. 3 separately shows value intervals obtained through division when the warning threshold is $2\sigma$, $3\sigma$, and $4\sigma$. As shown in FIG. 3, there are six value intervals obtained through division based on $2\sigma$, $3\sigma$, and $4\sigma$.

In this embodiment, the warning threshold is not selected based on experience, but is selected based on Gaussian distribution. In addition, because Gaussian distribution is more closely related to a real distribution status of a performance value of each performance, the warning threshold selected by using Gaussian distribution is more accurate, and further, a warning interval obtained through division by using the warning threshold is more accurate, thereby further ensuring warning accuracy.

Further, an implementable manner of determining battery warning information that has a preset mapping relationship with each of the N performance values as the battery warning information of the target vehicle includes: determining, based on a preset mapping relationship between the value interval of each of the N performances and a warning level classified for each performance, a warning level corresponding to the performance value corresponding to each performance in the N performance values; and determining battery warning information that has a preset mapping relationship with each of N warning levels that are in a one-to-one correspondence with the N performance values as the battery warning information of the target vehicle.

It may be understood that, when a performance value of a particular performance is in different value intervals, a degree of impact of the performance value on safety of the vehicle battery may be different, that is, impact caused on the battery is of different levels.

Therefore, in this embodiment, warning levels may be further divided for different value intervals, that is, mapping relationships between different value intervals and warning levels are determined. Then, for the N performances, when the battery warning information that has the preset mapping relationship with each of the N performance values is determined as the battery warning information of the target vehicle, only the battery warning information that has the preset mapping relationship with each of the N warning levels that are in a one-to-one correspondence with the N performance values needs to be determined as the battery warning information of the target vehicle.

For example, for Gaussian distribution shown in FIG. 3, it is assumed that the Gaussian distribution is Gaussian distribution that the voltage difference at rest performance satisfies. For ease of description, $2\sigma$, $3\sigma$, and $4\sigma$ on the left of a central axis of the Gaussian distribution are denoted as $-2\sigma$, $-3\sigma$, and $-4\sigma$ respectively. In this example, it is assumed that when the value interval is $[-2\sigma, 2\sigma]$, it is considered that the battery is relatively safe; when the value interval is $[-3\sigma, -2\sigma]$ and $[2\sigma, 3\sigma]$, it is considered that the battery may be unsafe; and when the value interval is $[-4\sigma, -3\sigma]$ and $[3\sigma, 4\sigma]$, it is considered that the battery is necessarily unsafe.

During implementation, it may be determined that a warning level corresponding to the value interval $[-2\sigma, 2\sigma]$ is level 1, a warning level corresponding to the value interval $[-3\sigma, -2\sigma]$ and the value interval $[2\sigma, 3\sigma]$ is level 2, and a warning level corresponding to the value interval $[-4\sigma, -3\sigma]$ and the value interval $[3\sigma, 4\sigma]$ is level 3. A higher warning level indicates lower safety of the battery.

The foregoing Gaussian distribution function is merely an example, and the distribution function may alternatively be a normal distribution function or the like. This is not limited in this embodiment of the present disclosure.

In this implementation, after each of the N performance values is obtained, a warning level corresponding to a performance value corresponding to each performance in the N performance values may be first determined based on a preset mapping relationship between the value interval of each of the N performances and a warning level classified for each performance; and then battery warning information that has a preset mapping relationship with each of the N warning levels that are in a one-to-one correspondence with the N performance values is determined as the battery warning information of the target vehicle.

In an optional embodiment, the battery warning system in this embodiment may further store mapping relationships between different safety warning levels and processing policies corresponding to different processing devices, and the method further includes: obtaining, from the mapping relationships, a target processing policy corresponding to a target processing device in the battery warning information of the target vehicle; and sending the target processing policy information and the target safety warning level information to the target processing device. For example, the target processing device includes any one of the following: a target vehicle, a target charging pile, a target battery swap station, and a target user terminal.

In this implementation, the battery warning system may automatically allocate processing measures based on different battery warning information, so that it can be ensured that processing measures for a same vehicle and a same battery are proper and consistent between different terminals and roles.

Figure 5:
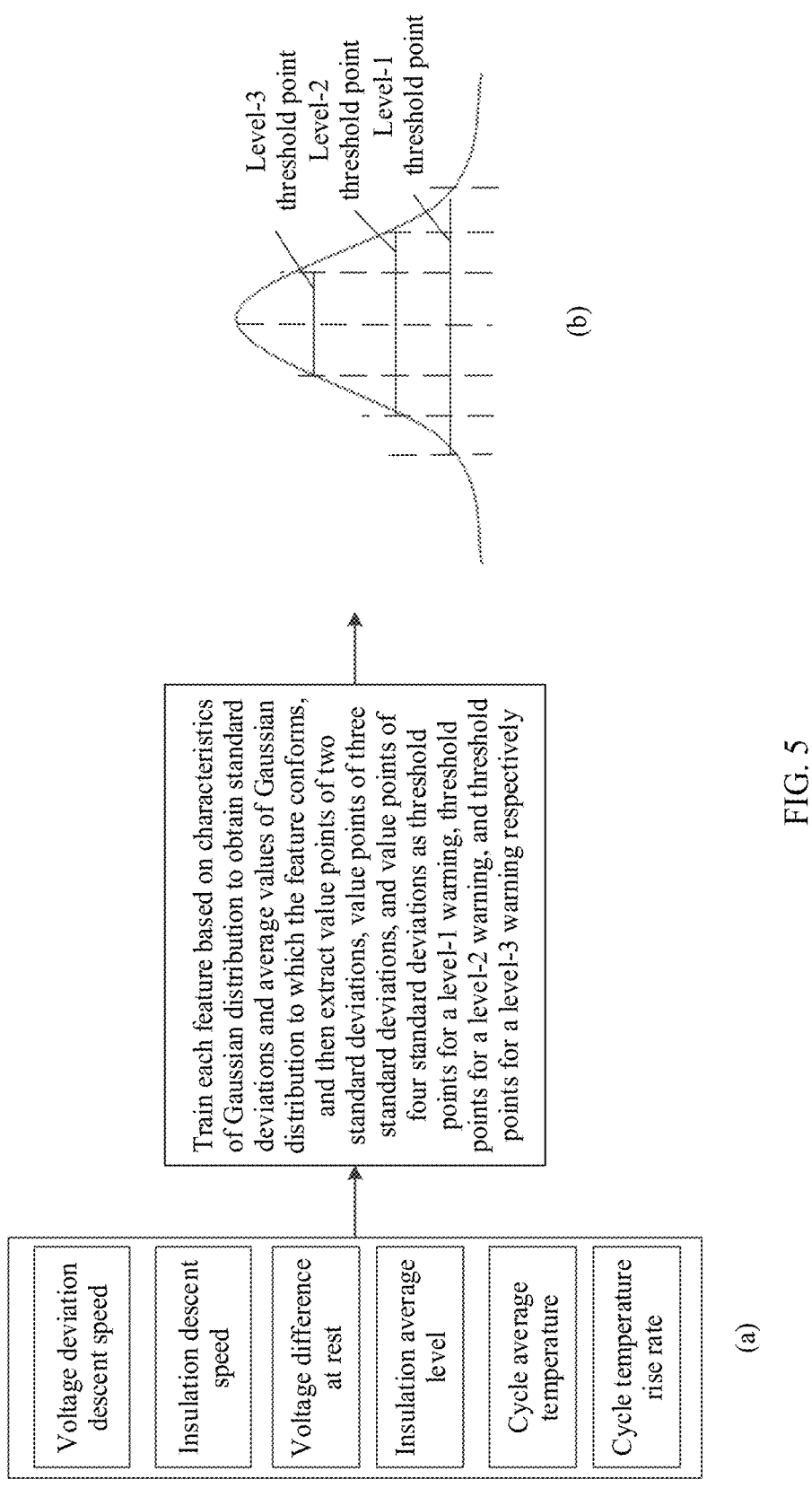
FIG. 5 is a schematic architectural diagram of training of a model training module according to an embodiment of the present disclosure.

With reference to FIG. 4 and FIG. 5, the following describes in detail an implementable manner of an embodiment of the present disclosure.

FIG. 4 is a schematic architectural diagram of a safety warning according to an embodiment of the present disclosure. As shown in FIG. 4, the architecture includes a battery warning system 401, and at least one of a vehicle 402, a charging pile 403, a battery swap station 404, a user terminal 405, an after-sales department 406 of an automobile enterprise, and a fire control institution 407.

The charging pile 403 may charge a battery in the vehicle 402, and the battery swap station 404 may charge the battery in the vehicle 402 and quickly swap a power battery. The user equipment 405 includes application software that can control the vehicle 402. The after-sales department 406 of the automobile enterprise can serve the vehicle 402, for example, maintain the vehicle 402. The fire control institution 407 is configured to extinguish a fire on the vehicle 402 when spontaneous combustion occurs on the vehicle 402.

In this embodiment, the battery warning system 401 is deployed in a cloud server. The battery warning system 401 is configured to: monitor safe and stable operation of the battery in the vehicle 402 and perform a fault warning.

Specifically, the battery warning system 401 includes a data receiving port, a data parsing module, a data warehouse, a model training module, a real-time warning module, a result coupling module, and a processing instruction delivery module.

The data receiving port is configured to receive real-time data of the vehicle 402 according to a communication protocol. It may be understood that, to implement communication between the vehicle 402 and the battery warning system 401, the vehicle 402 and the battery warning system 401 need to comply with the communication protocol. To be specific, when the vehicle 402 needs to send data to the battery warning system 401, the data is encapsulated into a format specified in the protocol, and then the encapsulated real-time data is sent to the battery warning system 401. Similarly, if the battery warning system 501 needs to send data to the vehicle 402, a principle is the same, and details are not described herein again. It should be noted herein that, the data receiving port in this embodiment may also be configured to receive data in the charging pile 403 and the battery swap station 404. This is not limited in this embodiment.

The data parsing module is configured to parse the received data into real data. For example, it is assumed that for a particular current value, based on the communication protocol, to implement communication with the battery warning system 401, the vehicle 402 needs to shift the current value rightwards by three bits when sending the current value. In this case, data received by the battery warning system 401 is not real data. Therefore, to obtain real data, the current value needs to be shifted leftward by three bits.

The data warehouse is configured to store real data that has been parsed by the data parsing module. It should be noted herein that, a period of time of historical data stored in the data warehouse is not limited in this embodiment of the present disclosure. For example, the historical data may be data of the vehicle 402 of a previous year, or may be data of a previous half year.

The model training module is configured to perform model training based on characteristic information that is about the battery in the vehicle 401 and that is stored in the data warehouse, to obtain a warning model.

The real-time calculation module is configured to: perform, based on a trained warning model, processing calculation on vehicle data that is parsed in real time, and output a calculation result of each piece of characteristic information.

The result coupling module is configured to: couple results of a plurality of pieces of characteristic information output by the real-time calculation module, and output final battery warning information.

The processing instruction delivery module is configured to deliver processing instructions to different processing devices based on the battery warning information and a given processing logic.

The following describes how the model training module performs training in the architecture shown in FIG. 5. In this embodiment, six eigenvalues are used as an example for description.

As shown in FIG. 5, the battery warning system 401 first determines a voltage deviation descent speed value, an insulation descent speed value, a voltage difference at rest value, an insulation average level value, a cycle average temperature value, and a cycle temperature rise rate value from the data warehouse, as shown in (a) in FIG. 5. M values are obtained for each of the foregoing six features. More specifically, the obtained M voltage deviation descent speed values and the obtained M insulation descent speed values are all historical values of the target vehicle, and the obtained M voltage difference at rest values, insulation average level values, cycle average temperature values, and cycle temperature rise rate values are all data of vehicles that are included in the data warehouse in the battery warning system 401 and that are of a same vehicle model, a same region, and a same operation mode as the target vehicle. In other words, it may be considered that the M voltage deviation descent speeds and the M insulation descent speeds can be used to describe a status of the target vehicle.

Data of vehicles of the same vehicle model, same region, and same operation mode can be used to describe a distribution status of features of the same vehicle model, same region, and same operation mode.

Then, after the foregoing features are obtained, it is considered that distribution of each feature conforms to Gaussian distribution. Therefore, respective Gaussian distribution is trained by using M eigenvalues corresponding to each feature, that is, a standard deviation and an average value of Gaussian distribution corresponding to each feature are determined by using the M eigenvalues. Then, for Gaussian distribution corresponding to each performance, value points corresponding to two standard deviations are selected as threshold points for the level-1 warning, value points corresponding to three standard deviations are selected as threshold points for the level-2 warning, and value points corresponding to four standard deviations are selected as threshold points for the level-3 warning. FIG. 5 (*b*) shows an example of the determined level-1 threshold points, level-2 threshold points, and level-3 threshold points.

Based on this, threshold points corresponding to each performance are determined. Further, a mapping relationship between a value interval and a warning level may be determined for each feature based on the threshold points. For the mapping relationship between the value interval and the warning level, refer to the description in the foregoing embodiments.

It may be understood that, after the mapping relationship between the value interval and the warning level is determined for each feature based on the threshold points, a safety warning may be performed on the target battery in the target vehicle based on the mapping relationship. Specifically, the battery warning system 401 obtains, in real time, the voltage deviation descent speed value, the insulation descent speed value, the voltage difference at rest value, the insulation average level value, the cycle average temperature value, and the cycle temperature rise rate value of the target vehicle in a target period of time, and then determines a corresponding warning level for a value corresponding to each feature based on the mapping relationship between the value interval and the warning level. It may be understood that, for the two features: the voltage deviation descent speed and the insulation descent speed, because training is performed by using historical data of the target vehicle during training of the two features, for the two values: the voltage deviation descent speed value and the insulation descent speed value that are obtained in real time, whether the target battery in the target vehicle has a deterioration trend may be determined based on the determined mapping relationship. For the voltage difference at rest value, the insulation average level value, the cycle average temperature value, and the cycle temperature rise rate value that are obtained in real time, because training is performed by using data of vehicles of a same vehicle model, a same region, and a same operation mode during training, for the voltage difference at rest value, the insulation average level value, the cycle average temperature value, and the cycle temperature rise rate value, it may be determined, based on the determined mapping relationship, whether a distribution status of the target battery in the target vehicle is abnormal, that is, whether the distribution status of the target battery in the target vehicle is different from that of another vehicle.

Further, in this embodiment, after the warning level corresponding to each eigenvalue obtained in real time is determined based on the mapping relationship that is between the value interval and the warning level and that corresponds to each feature, to further implement warning accuracy, warning levels corresponding to the eigenvalues may be further fused, for example, different warning levels are organically combined, so as to determine a final warning level and a processing measure.

Figure 6:
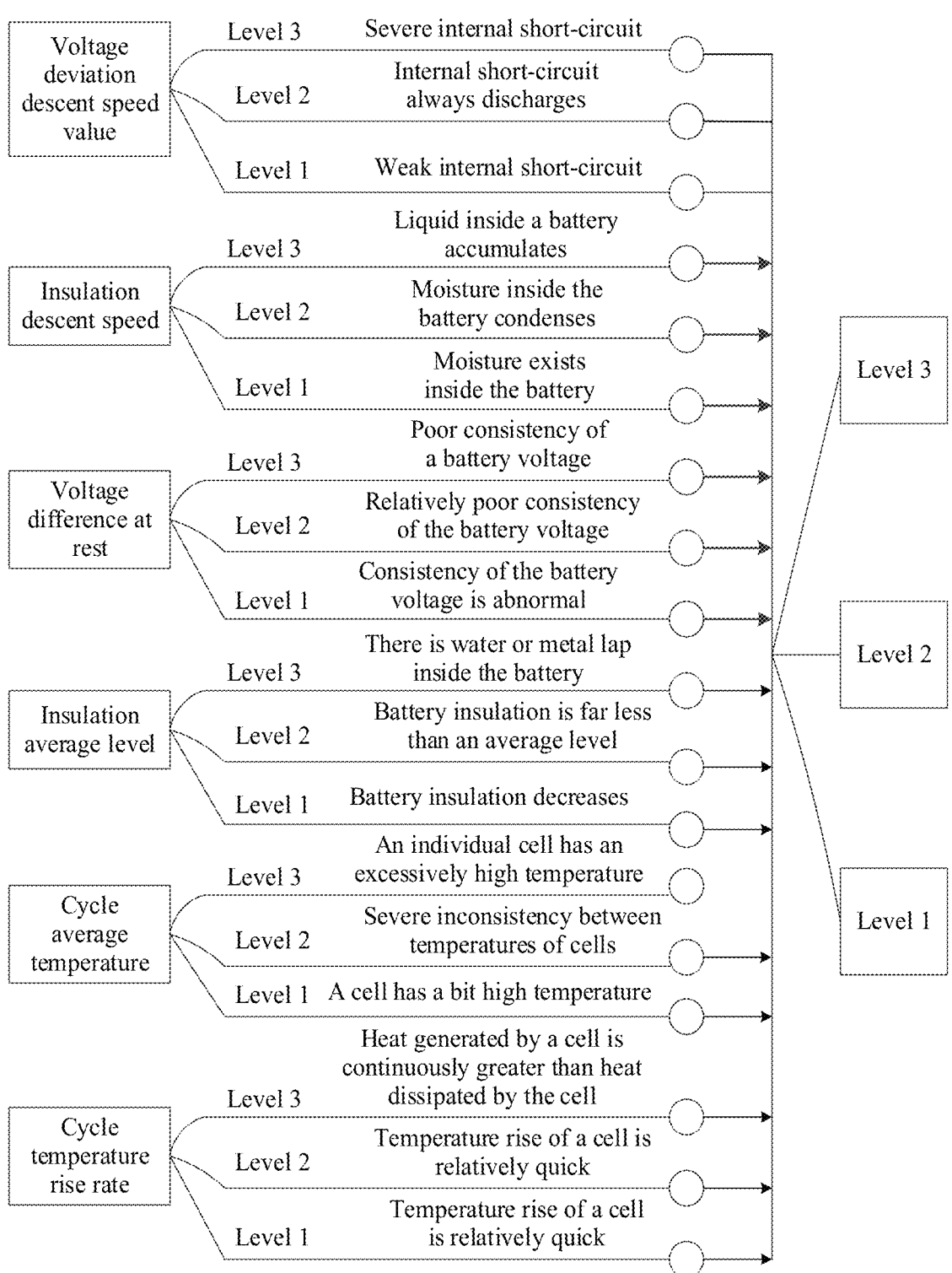
FIG. 6 is a schematic diagram of a structure of warning level fusion according to an embodiment of the present disclosure.

For example, as shown in FIG. 6, for example, each feature has three warning levels, and each warning level corresponding to each feature may represent different information of the vehicle battery. For details, refer to FIG. 6. In this case, during a test, each eigenvalue corresponds to a warning level. In this case, battery warning information that has a preset mapping relationship with each of N warning levels that are in a one-to-one correspondence with N eigenvalues may alternatively be preset in the battery warning system 401, and then the final warning level is determined based on the mapping relationship. For example, final warning levels also include three levels: the level-1 warning, the level-2 warning, and the level-3 warning. When the final warning level is the level-3 warning, it may be considered that high-risk emergency processing is required. When the final warning level is the level-2 warning, it may be considered that function fault maintenance processing is required. When the final warning level is the level-1 warning, it may be considered that impact is small and may be observed continuously.

Further, after the final warning level is determined, the battery warning system 401 may send the target processing policy information and the target safety warning level information to the target processing device, where the target processing policy information indicates an operation performed by the target processing device in the target safety warning level information.

In this embodiment, when the battery warning system determines a final warning result, the battery warning system automatically delivers a processing instruction action to the target vehicle, the target charging pile, the target battery swap station, the user, the after-sales department of the automobile enterprise, and the fire control institution based on a pre-formulated fault processing procedure, so that terminals and roles share same battery information, a same warning result, and a same processing suggestion when processing a same vehicle and a same battery, thereby ensuring proper and consistent processing methods.

With reference to FIG. 7, the following describes a schematic flowchart of a battery safety warning method according to another embodiment of the present disclosure.

As shown in FIG. 7, the method in this embodiment may include S701, S702, S703, and S704.

S701: Determine target safety warning level information of a target vehicle battery.

For a part about how to determine the target safety warning level information of the target vehicle battery, refer to the descriptions in the foregoing embodiments of the present disclosure.

S702: Determine target processing policy information based on mapping relationships between different safety warning levels and processing policies corresponding to different processing devices, where the target processing policy information indicates an operation performed by a target processing device in the target safety warning level information.

For example, stored safety warning levels may include a level-1 warning, a level-2 warning, and a level-3 warning. A higher warning level degree indicates lower safety of the battery.

For example, different processing devices include, for example, a target vehicle, a target charging pile, a target battery swap station, and a target mobile phone.

In this embodiment, the battery warning system stores mapping relationships between safety warning levels and processing policies corresponding to different processing devices. In other words, after determining the target safety warning level information of the target vehicle battery, the battery warning system may determine, based on the stored mapping relationships between the different safety warning levels and the processing policies corresponding to the different processing devices, the processing policies corresponding to the different processing devices in the target safety warning level information.

In an example, it is assumed that the mapping relationships between the safety warning levels and the processing policies corresponding to the different processing devices include: At the level-1 safety warning level, the processing policy corresponding to the target vehicle is turning on a warning light, and the processing policy corresponding to the mobile phone is displaying a fault by using an application (APP); and at the level-2 safety warning level, the processing policy corresponding to the target vehicle is turning on the warning light and providing a voice prompt, and the processing policy corresponding to the mobile phone is displaying a fault and a processing suggestion by using the APP. In this case, when it is determined that the target safety warning level information of the target vehicle battery is the level-1 warning, it may be determined that the processing policy corresponding to the target vehicle is turning on a warning light, and the processing policy corresponding to the mobile phone is displaying a fault by using the APP.

It should be noted herein that the mapping relationships between the safety warning levels and the processing policies corresponding to the different processing devices in this embodiment are merely an example, and may also include more information, and do not constitute a limitation on this embodiment of the present disclosure.

S703: Send the target processing policy information and the target safety warning level information to the target processing device, and correspondingly, the target processing device receives the target processing policy information and the target safety warning level information.

In this embodiment, after determining the target safety warning level information and the target processing policy information, the battery warning system may send the target safety warning level information and the target processing policy information to the target processing device. Correspondingly, the target processing device receives the target safety warning level information and the target processing policy information.

S704: The target processing device performs a first operation according to an indication of the target processing policy information when the target vehicle battery is in the target safety warning level information.

In this embodiment, after receiving the target safety warning level information and the target processing policy information, the target processing device may perform a corresponding operation (that is, the first operation) based on the indication of the target processing policy information.

For example, the target processing device is the target vehicle, the target safety warning level information is the level-1 warning information, and the target processing policy information received by the target vehicle is turning on the warning light. In this case, the target vehicle may perform an operation of turning on the warning light.

For example, the target processing device is the mobile phone, the target safety warning level information is the level-1 warning information, and the target processing policy information received by the target mobile phone is displaying a fault by using the APP. In this case, the target mobile phone may perform an operation of displaying the fault by using the APP.

In this embodiment, the target processing device may process the target vehicle battery based on the indication of the target processing policy information. In other words, a device (a battery warning system) that sends the target processing policy information and the target safety warning level information may share, with the target processing device, information about a same target vehicle battery and information about how the target processing device should process the target vehicle battery in the target safety warning level information, so that the target processing device and the battery warning system can share information about a same battery.

In an optional embodiment, when the target safety warning level information is the level-1 warning information, the battery warning system may determine that the target processing policy information includes the following information: turning on the warning light by the target vehicle. Then, the target processing policy information may be sent to the target vehicle. Correspondingly, the target vehicle receives the target processing policy information, and performs an operation of turning on the warning light.

In this embodiment, when the target vehicle receives the level-1 warning information and the target processing policy information about turning on the warning light by the target vehicle, the target vehicle performs the operation of turning on the warning light, so as to implement a safety warning for the vehicle battery.

In an optional embodiment, when the target safety warning level information is the level-1 warning information and the target vehicle is being charged by using the target charging pile, the battery warning system may determine that the target processing policy information further includes the following information: limiting a charging power of the target vehicle battery by the target charging pile; and correspondingly, when the target vehicle is being charged by using the target charging pile, the target charging pile performs an operation of limiting the charging power of the target vehicle battery.

In this implementation, the target processing policy information determined by the battery warning system may further include limiting the charging power of the target vehicle battery by the target charging pile. In this case, if the target vehicle is being charged by using the target charging pile, the battery warning system may further send, to the target charging pile, the target processing policy information about limiting the charging power of the target vehicle battery by the target charging pile. In this case, the target charging pile may perform an operation of limiting the charging power of the target vehicle battery, to implement a safety warning for the vehicle battery.

In an optional embodiment, when the target safety warning level information is the level-1 warning information and the target vehicle is swapping a battery by using the target battery swap station, the battery warning system may determine that the target processing policy information further includes the following information: limiting the charging power of the target vehicle battery by the target battery swap station; and correspondingly, when the target vehicle is swapping a battery by using the target battery swap station, the target battery swap station performs an operation of limiting the charging power of the target vehicle battery.

In this implementation, the target processing policy information determined by the battery warning system may further include limiting the charging power of the target vehicle battery by the target battery swap station. In this case, if the target vehicle is swapping a battery by using the target battery swap station, the battery warning system may further send, to the target battery swap station, the target processing policy information about limiting the charging power of the target vehicle battery by the target battery swap station. In this case, the target battery swap station may perform an operation of limiting the charging power of the target vehicle battery, to implement a safety warning for the vehicle battery.

In an optional embodiment, when the target safety warning level information is the level-2 warning information, the battery warning system may determine that the target processing policy information includes at least one piece of the following information: turning on the warning light by the target vehicle, and limiting a use power of the target vehicle battery based on a message prompt of the target vehicle. Correspondingly, the target vehicle performs at least one of the following operations: turning on the warning light by the target vehicle, and limiting the use power of the target vehicle battery based on the message prompt of the target vehicle.

It may be understood that, when the target safety warning level information is the level-2 warning information, compared with the level-1 warning information, a battery of a target vehicle corresponding to the level-2 warning information may be less safe than a battery of the target vehicle corresponding to the level-1 warning information. Therefore, in this implementation, when the battery warning information determines the target processing policy information of the target vehicle, the level-2 warning information corresponds to more target processing policy information of the target vehicle than the target processing policy information of the target vehicle corresponding to the level-1 warning information, for example, at least one of turning on the warning light by the target vehicle and limiting the use power of the target vehicle battery based on the message prompt of the target vehicle. Correspondingly, when the target vehicle receives the level-2 warning information and the target processing policy, the target vehicle may perform operations of turning on the warning light and limiting the use power of the target vehicle battery based on the message prompt of the target vehicle, so as to implement a safety warning for the vehicle battery.

In an optional embodiment, when the target safety warning level information is the level-2 warning information and the target vehicle is being charged by using the target charging pile, the battery warning system may determine that the target processing policy information further includes at least one piece of the following information: limiting a charging power of the target vehicle by the target charging pile, and limiting a charging upper limit of the target charging pile. Correspondingly, when the target vehicle is being charged by using the target charging pile, the target charging pile performs at least one of the following operations: limiting the charging power of the target vehicle, and limiting the charging upper limit.

In this implementation, when the target safety warning level information is the level-2 warning information, the target processing policy information determined by the battery warning system may further include at least one of the following: limiting the charging power of the target vehicle, and limiting the charging upper limit. In this case, if the target vehicle is being charged by using the target charging pile, the battery warning system may further send the at least one piece of target processing policy information to the target charging pile. In this case, the target charging pile may perform at least one operation of limiting the charging power of the target vehicle and limiting the charging upper limit, to implement a safety warning for the vehicle battery.

In an optional embodiment, when the target safety warning level information is the level-2 warning information and the target vehicle is swapping a battery by using the target battery swap station, the battery warning system may determine that the target processing policy information further includes at least one piece of the following information: limiting a charging power of the target vehicle battery by the target battery swap station, limiting a charging upper limit by the target battery swap station, and starting an after-sales procedure of the target vehicle battery. Correspondingly, when the target vehicle is swapping a battery by using the target battery swap station, the target battery swap station performs at least one of the following operations: limiting the charging power of the target vehicle battery, limiting the charging upper limit, and starting the after-sales procedure of the target vehicle battery.

In this implementation, when the target safety warning level information is the level-2 warning information, the target processing policy information determined by the battery warning system may further include at least one of the following operations: limiting the charging power of the target vehicle battery by the target battery swap station, limiting the charging upper limit by the target battery swap station, and starting the after-sales procedure of the target vehicle battery. In this case, if the target vehicle is swapping a battery by using the target battery swap station, the battery warning system may further send the target processing policy information of the at least one of the foregoing operations to the target battery swap station. In this case, the target battery swap station may perform at least one of the following operations: limiting the charging power of the target vehicle battery, limiting the charging upper limit, and starting the after-sales procedure of the target vehicle battery, so as to implement a safety warning for the vehicle battery.

In an optional embodiment, when the target safety warning level information is the level-2 warning information, the battery warning system may determine that the target processing policy information further includes at least one piece of the following information: providing fault prompt information by the target mobile phone, and displaying a processing suggestion by the target mobile phone. Correspondingly, the target mobile phone performs at least one of the following operations: providing the fault prompt information, and displaying the processing suggestion.

In this implementation, when the target safety warning level information is the level-2 warning information, a safety warning can be performed on the target vehicle battery by using the mobile phone.

In an optional embodiment, when the target safety warning level information is the level-3 warning information, the battery warning system may determine that the target processing policy information includes at least one piece of the following information: turning on the warning light by the target vehicle, and issuing the voice alarm by the target vehicle. Correspondingly, the target vehicle performs at least one of the following operations: turning on the warning light and issuing the voice alarm.

Optionally, when the target vehicle is traveling or a current vehicle speed of the target vehicle is not 0, the battery warning system determines that the target processing policy information further includes at least one piece of the following information: limiting a use power of the target vehicle battery by the target vehicle, and reminding, by the target vehicle, a user to safely park and leave the target vehicle. Correspondingly, the target vehicle further performs at least one of the following operations: limiting the use power of the target vehicle battery, and reminding the user to safely park and leave the target vehicle.

Optionally, when the target vehicle does not travel or a current vehicle speed of the target vehicle is 0, the battery warning system may determine that the target processing policy information further includes at least one piece of the following information: unlocking a vehicle door by the target vehicle, and reminding, by the target vehicle in voice, the user to leave the target vehicle and start a fire extinguishing program of the target vehicle. Correspondingly, the target vehicle further performs at least one of the following operations: unlocking the vehicle door by the target vehicle, and reminding, by the target vehicle in voice, the user to leave the target vehicle and start the fire extinguishing program of the target vehicle.

In an optional embodiment, when the target safety warning level information is the level-3 warning information and the target vehicle is being charged by using the target charging pile, the battery warning system may further determine that the target processing policy information further includes at least one piece of the following information: stopping, by the target charging pile, charging the target vehicle battery, and notifying, by the target charging pile in voice, the user to start a fire processing procedure of the charging station. Correspondingly, when the target vehicle is being charged by using the target charging pile, the target charging pile performs at least one of the following operations: stopping charging the target vehicle battery, and notifying, in voice, the user to start the fire processing procedure of the charging station.

In an optional embodiment, when the target safety warning level information is the level-3 warning information and the target vehicle is to be charged by using the target charging pile, the battery warning system may further determine that the target processing policy information further includes at least one piece of the following information: rejecting, by the target charging pile, to charge the target vehicle battery, and notifying, by the target charging pile in voice, the user to start a fire processing procedure of the charging station.

In an optional embodiment, when the target safety warning level information is the level-3 warning information and the target vehicle is being charged by using the target battery swap station, the battery warning system may further determine that the target processing policy information further includes at least one piece of the following information: stopping, by the target battery swap station, charging the target vehicle battery, and notifying, by the target battery swap station in voice, the user to start a fire processing procedure of the charging station. Correspondingly, the target battery swap station performs at least one of the following operations: stopping charging the target vehicle battery, and notifying, in voice, the user to start the fire processing procedure of the charging station.

In an optional embodiment, when the target safety warning level information is the level-3 warning information and the target vehicle is to swap a battery by using the target battery swap station, the battery warning system may further determine that the target processing policy information further includes at least one piece of the following information: rejecting, by the target battery swap station, to charge the target vehicle battery, and notifying, by the target battery swap station in voice, the user to start a fire processing procedure of the charging station. Correspondingly, the target battery swap station performs at least one of the following operations: rejecting to charge the target vehicle battery, and notifying, in voice, the user to start the fire processing procedure of the charging station.

In an optional embodiment, when the target safety warning level information is the level-3 warning information, the battery warning system may further determine that the target processing policy information further includes at least one piece of the following information: issuing a voice alarm, a short message service message alarm, and a message alarm by the target mobile phone, and reminding the user to leave the target vehicle. Correspondingly, the target mobile phone performs at least one of the following operations: issuing the voice alarm, the short message service message alarm, and the message alarm, and reminding the user to leave the target vehicle.

Figure 8A:
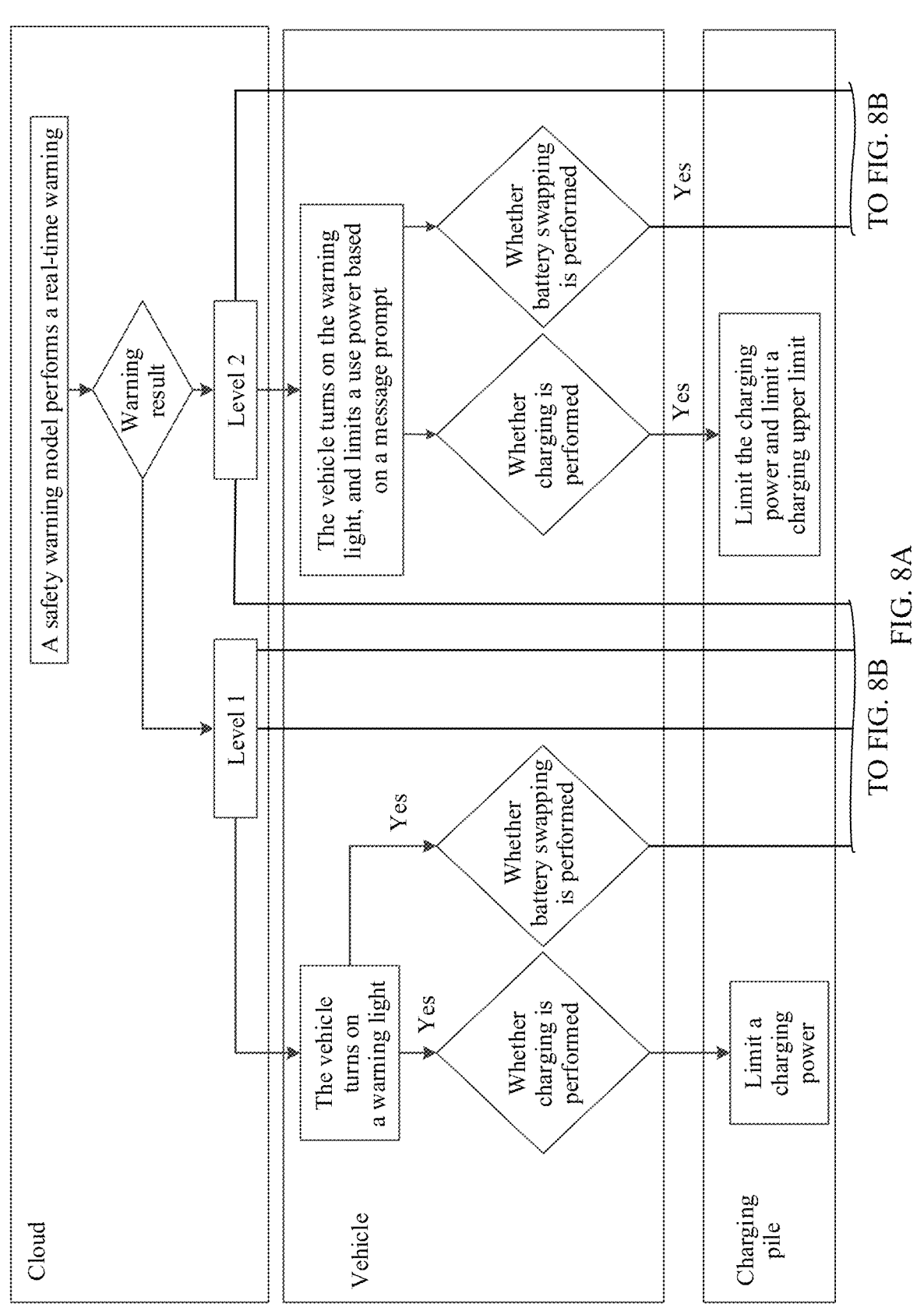
FIG. 8A and FIG. 8B are a schematic diagram of processing when warning results are level 1 and level 2.
Figure 8B:
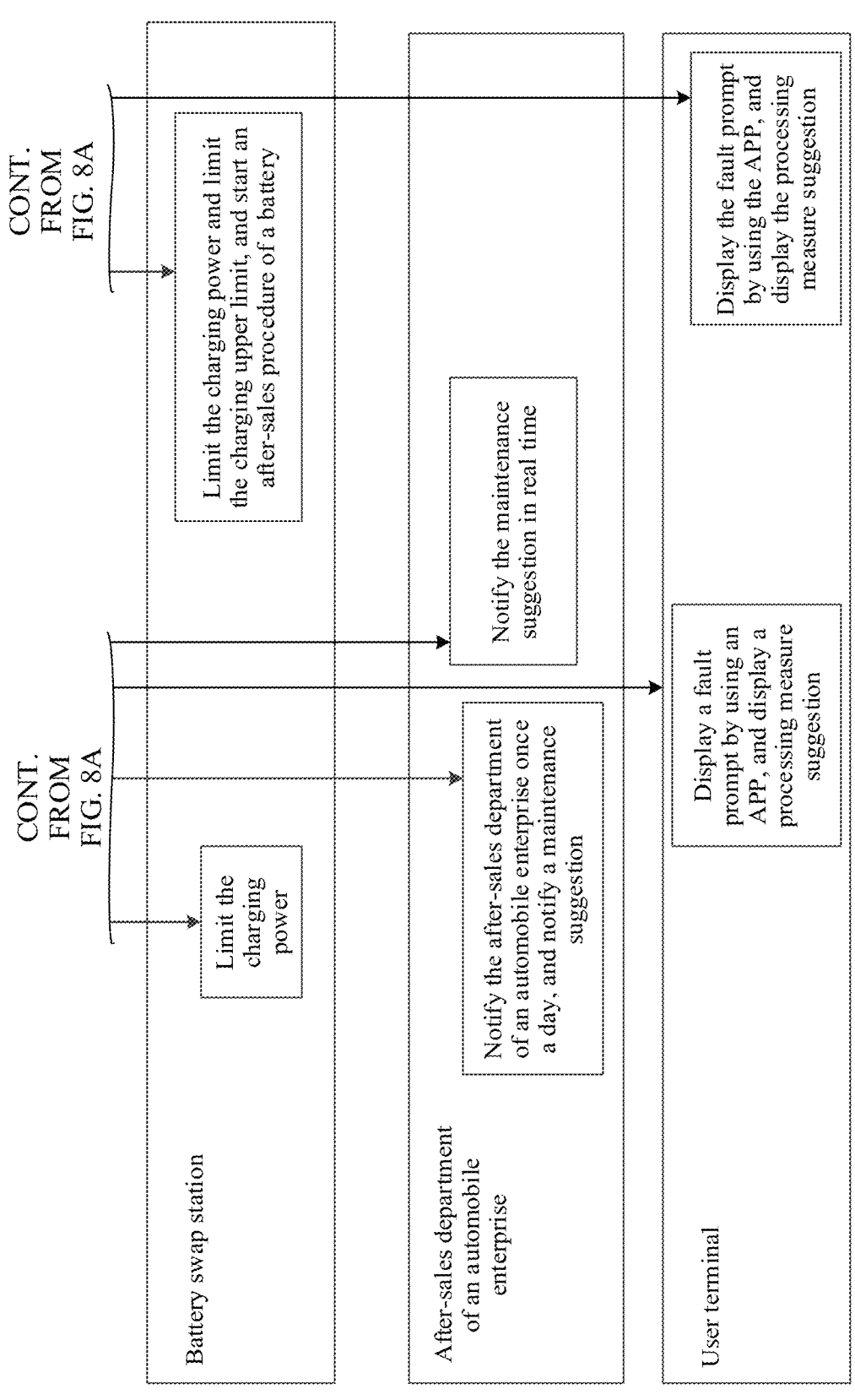

For example, for ease of understanding, FIG. 8A and FIG. 8B are a schematic diagram of processing when final warning results are level 1 and level 2. As shown in FIG. 8A and FIG. 8B, when determining that the final warning result is level 1, the battery warning system may prompt the vehicle to turn on the warning light, and may further determine a processing suggestion for the charging pile and the battery swap station based on a current charging state and a current battery swapping state of the vehicle. For example, when the vehicle is charged, the battery warning system may prompt the charging pile to limit a charging power, and when the vehicle swaps a battery at the battery swap station, the battery warning system may prompt the battery swap station to limit a battery swapping power. In addition, the battery warning system may further notify the after-sales department of the automobile enterprise of a maintenance suggestion for the target vehicle once a day, display a fault prompt to the user by using an APP in the user terminal, and send a processing measure suggestion.

When the battery warning system determines that the final warning result is level 2, because the level-2 warning indicates that a safety problem may occur on the vehicle, in this case, a processing suggestion may be of a higher amplitude than that for the level-1 warning. For example, when the vehicle is prompted to turn on the warning light, the use power of the vehicle may be limited based on a message prompt. Similarly, when the level-2 warning is performed, the processing suggestion for the charging pile and the battery swap station may be further determined based on the current charging state and the current battery swapping state of the vehicle. For example, when the vehicle is charged, the battery warning system may prompt the charging pile to limit the charging power and limit the charging upper limit. When the vehicle swaps a battery at the battery swap station, the battery warning system may prompt the battery swap station to limit the battery swapping power and the battery swapping upper limit, and prompt to start an after-sales procedure of the battery. In addition, the battery warning system notifies the after-sales department of the automobile enterprise of a maintenance suggestion for the vehicle in real time, displays a fault prompt, and sends a processing measure suggestion by using the APP in the user terminal.

Figure 9A:
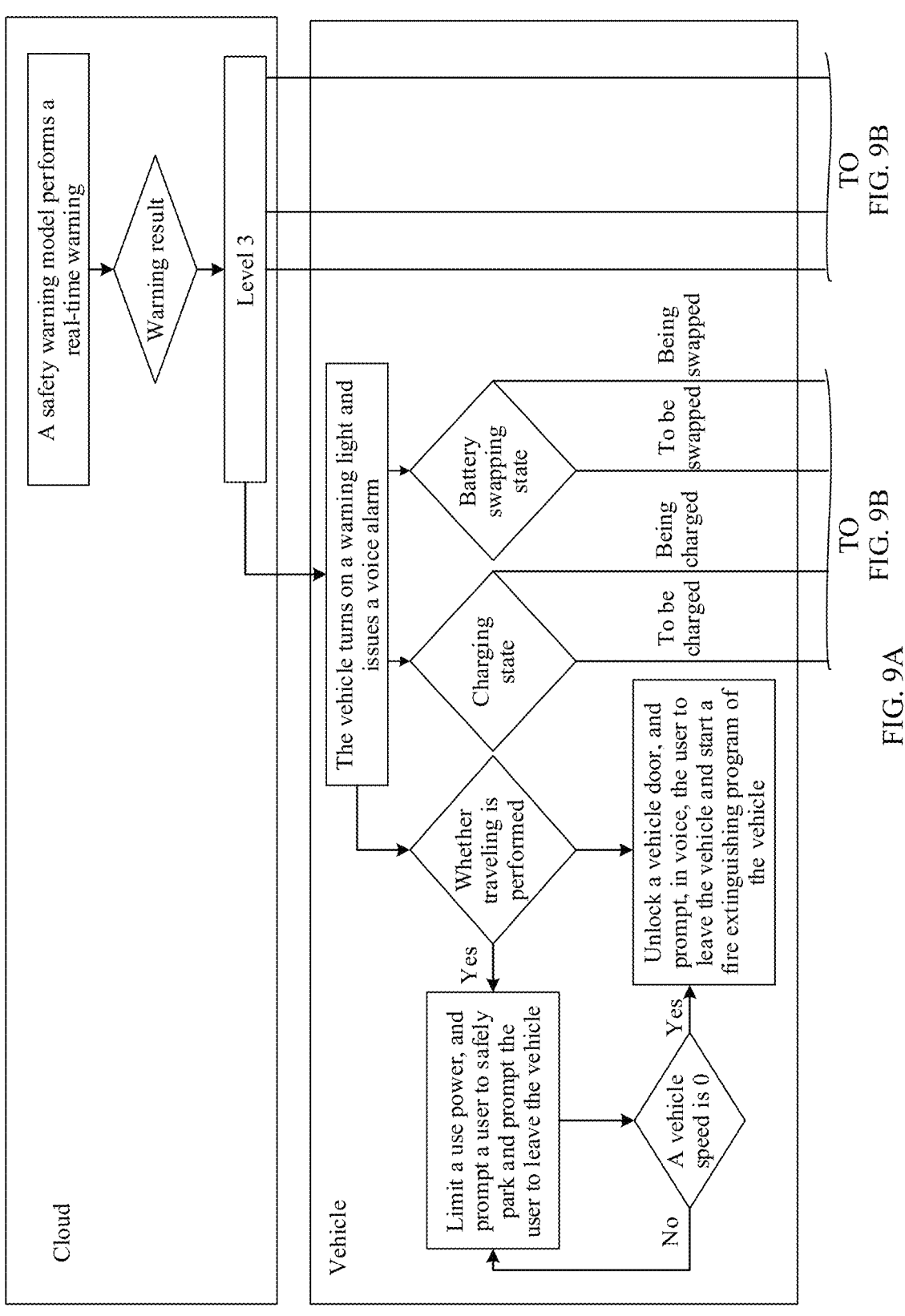
FIG. 9A and FIG. 9B are a schematic diagram of processing when a warning result is level 3.
Figure 9B:
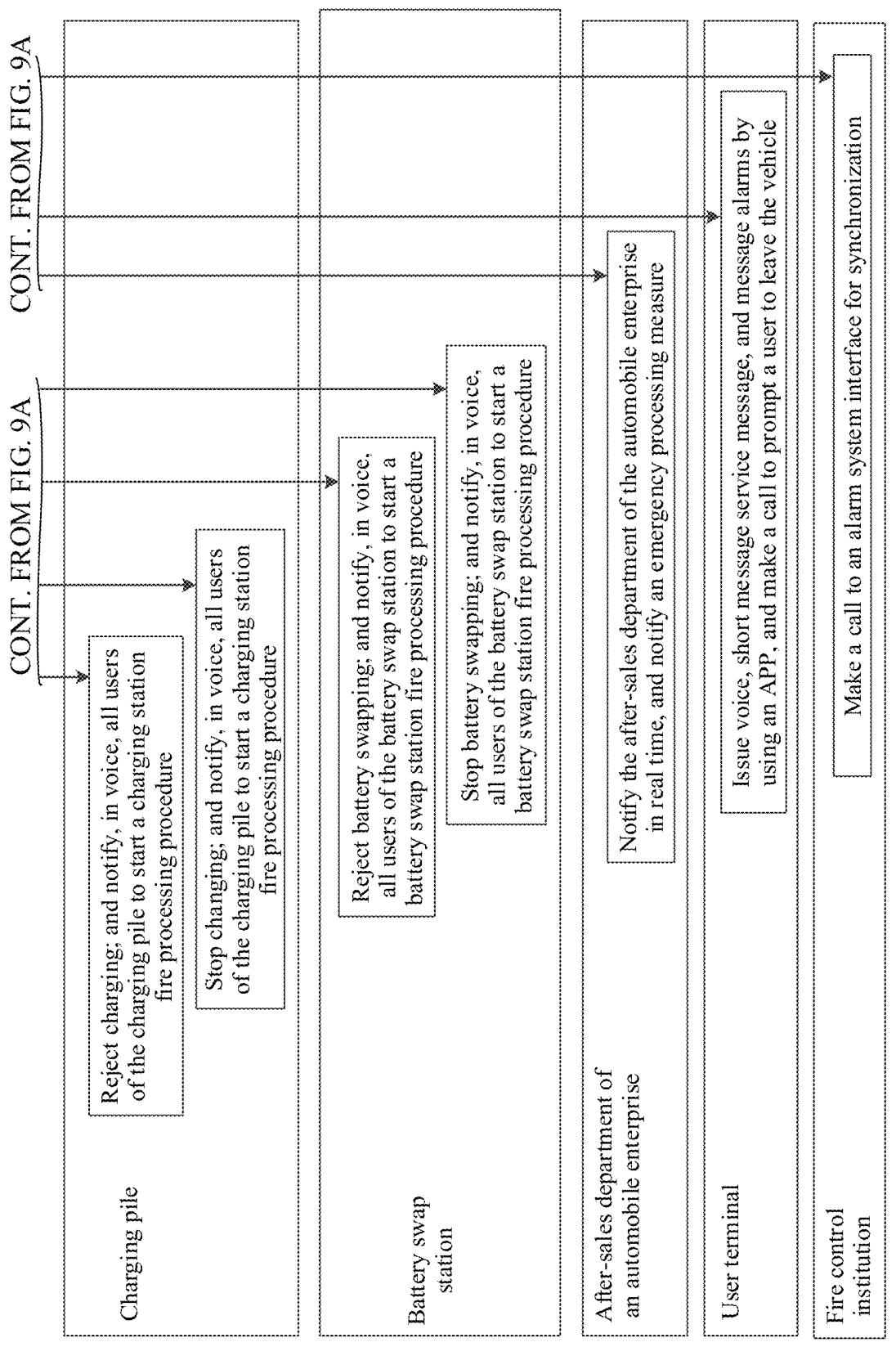

For example, FIG. 9A and FIG. 9B are a schematic diagram of processing when a final warning result is level 3. As shown in FIG. 9A and FIG. 9B, when the battery warning system determines that the warning result is the level-3 warning, in this case, it indicates that a degree of thermal runaway of the battery in the vehicle may be quite serious. In this case, for the vehicle, in addition to prompting the vehicle to turn on the warning light, a voice alarm may be further issued, and further warning prompt may be performed based on a traveling state of the vehicle. For example, when the vehicle travels, the use power of the target vehicle may be limited, the user is prompted to safely park, and the user is prompted to leave the vehicle. Further, if a current vehicle speed of the vehicle is 0, a vehicle door of the target vehicle may be unlocked, and a voice prompt may be made to the user to leave the vehicle and start a fire extinguishing program. A processing suggestion for the charging pile and the battery swap station may be further determined based on a current charging state and a current battery swapping state of the vehicle. For example, when the vehicle is to be charged, the battery warning system may prompt the charging pile to reject charging and notify, in voice, all users of the charging pile to start a charging station file processing procedure. When the vehicle is being charged, the battery warning system may prompt the charging pile to stop charging and notify, in voice, all users of the charging pile to start a charging station fire processing procedure. When the vehicle is to swap a battery at the battery swap station, the battery warning system may prompt the battery swap station to reject battery swapping and notify, in voice, all users of the battery swap station to start a battery swap station fire processing procedure. When the vehicle is swapping a battery, the battery warning system may prompt the charging pile to stop battery swapping, and notify, in voice, all users of the charging pile to start a charging station fire processing procedure. In addition, the battery warning system may further notify the after-sales department of the automobile enterprise in real time, and notify the after-sales department of the automobile enterprise of a maintenance suggestion for the target vehicle. In addition, the battery warning system issues voice, short message service message, and message alarms by using the APP, or makes a call to prompt the user to leave the vehicle. It may be understood that, when the battery warning system determines that the warning level is level 3, it indicates that a thermal runaway phenomenon of the battery in the vehicle is already quite serious. Therefore, in this embodiment, the battery warning system may also send warning prompt information to the fire control institution. For example, a call is made to an alarm system interface, to synchronize the prompt information to the fire control institution.

In this embodiment, when the battery warning system determines a warning result, the battery warning system may automatically deliver a processing instruction action to the target vehicle, the target charging pile, the target battery swap station, the user, the after-sales department of the automobile enterprise, and the fire control institution based on a pre-formulated fault processing procedure, so that terminals and roles share same battery information, a same warning result, and a same processing suggestion when processing a same vehicle and a same battery, thereby ensuring proper and consistent processing methods.

Figure 10:
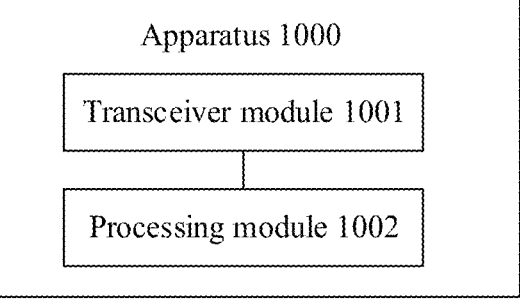
FIG. 10 is a schematic diagram of a structure of a battery safety warning apparatus according to an embodiment of the present disclosure.

FIG. 10 is a schematic diagram of a structure of a battery safety warning apparatus according to an embodiment of the present disclosure. The apparatus 1000 includes: a transceiver module 1001 configured to receive target processing policy information and target safety warning level information; and a processing module 1002 configured to perform, by a target processing device, a first operation according to an indication of the target processing policy information when a target vehicle battery is in the target safety warning level information.

In a possible implementation, the target safety warning level information is any one of the following: level-1 warning information, level-2 warning information, and level-3 warning information.

In a possible implementation, the target processing device includes at least one of the following: a target vehicle, a target charging pile, a target battery swap station, and a target mobile phone.

In a possible implementation, the target safety warning level information is the level-1 warning information, and the target processing policy information includes the following information: turning on a warning light by the target vehicle; and correspondingly, the target processing device is the target vehicle, and in this case, the processing module 1002 is located in the target vehicle, and the processing module 1002 is specifically configured to perform, by the target vehicle, an operation of turning on the warning light.

In a possible implementation, the target processing policy information further includes the following information: limiting a charging power of the target vehicle battery by the target charging pile; and correspondingly, the target processing device is the target charging pile, and in this case, the processing module 1002 is located in the target charging pile, and the processing module 1002 is specifically configured to: when the target vehicle is being charged by using the target charging pile, perform, by the target charging pile, an operation of limiting the charging power of the target vehicle battery.

In a possible implementation, the target processing policy information further includes the following information: limiting the charging power of the target vehicle battery by the target battery swap station; and correspondingly, the target processing device is the target battery swap station, and in this case, the processing module 1002 is located in the target battery swap station, and the processing module 1002 is specifically configured to: when the target vehicle is swapping a battery by using the target battery swap station, perform, by the target battery swap station, an operation of limiting the charging power of the target vehicle battery.

In a possible implementation, when the target safety warning level information is the level-2 warning information, the target processing policy information includes at least one piece of the following information: turning on a warning light by the target vehicle, and limiting a use power of the target vehicle battery based on a message prompt of the target vehicle; and correspondingly, the target processing device is the target vehicle, and in this case, the processing module 1002 is located in the target vehicle, and the processing module 1002 is specifically configured to perform at least one of the following operations by the target vehicle: turning on the warning light by the target vehicle, and limiting the use power of the target vehicle battery based on the message prompt of the target vehicle.

In a possible implementation, the target processing policy information further includes at least one piece of the following information: limiting a charging power of the target vehicle by the target charging pile, and limiting a charging upper limit of the target charging pile; and correspondingly, the target processing device is the target charging pile, and in this case, the processing module 1002 is located in the target charging pile, and the processing module 1002 is specifically configured to: when the target vehicle is being charged by using the target charging pile, perform, by the target charging pile, at least one of the following operations: limiting the charging power of the target vehicle, and limiting the charging upper limit.

In a possible implementation, the target processing policy information further includes at least one piece of the following information: limiting a charging power of the target vehicle battery by the target battery swap station, limiting a charging upper limit by the target battery swap station, and starting an after-sales procedure of the target vehicle battery; and correspondingly, the target processing device is the target battery swap station, and in this case, the processing module 1002 is located in the target battery swap station, and the processing module 1002 is specifically configured to: when the target vehicle is swapping a battery by using the target battery swap station, perform, by the target battery swap station, at least one of the following operations: limiting the charging power of the target vehicle battery, limiting the charging upper limit, and starting the after-sales procedure of the target vehicle battery.

In a possible implementation, the target processing policy information further includes at least one piece of the following information: providing fault prompt information by the target mobile phone, and displaying a processing suggestion by the target mobile phone; and correspondingly, the target processing device is the target mobile phone, and in this case, the processing module 1002 is located in the target mobile phone, and the processing module 1002 is specifically configured to perform at least one of the following operations by the target mobile phone: providing the fault prompt information and displaying the processing suggestion.

In a possible implementation, when the target safety warning level information is the level-3 warning information, the target processing policy information includes at least one piece of the following information: turning on a warning light by the target vehicle, and issuing a voice alarm by the target vehicle; and correspondingly, the target processing device is the target vehicle, and in this case, the processing module 1002 is located in the target vehicle, and the processing module 1002 is specifically configured to perform at least one of the following operations by the target vehicle: turning on the warning light and issuing the voice alarm.

In a possible implementation, when the target vehicle is traveling or a current vehicle speed of the target vehicle is not 0, the target processing policy information further includes at least one piece of the following information: limiting a use power of the target vehicle battery by the target vehicle, and reminding, by the target vehicle, a user to safely park and leave the target vehicle; and correspondingly, the target processing device is the target vehicle, and in this case, the processing module 1002 is located in the target vehicle, and the processing module 1002 is specifically configured to perform at least one of the following operations by the target vehicle: limiting the use power of the target vehicle battery, and reminding the user to safely park and leave the target vehicle.

In a possible implementation, when the target vehicle does not travel or a current vehicle speed of the target vehicle is 0, the target processing policy information further includes at least one piece of the following information: unlocking a vehicle door by the target vehicle, and reminding, by the target vehicle in voice, a user to leave the target vehicle and start a fire extinguishing program of the target vehicle; and correspondingly, the target processing device is the target vehicle, and in this case, the processing module 1002 is located in the target vehicle, and the processing module 1002 is specifically configured to perform at least one of the following operations by the target vehicle: unlocking the vehicle door by the target vehicle, and reminding, by the target vehicle in voice, the user to leave the target vehicle and start the fire extinguishing program of the target vehicle.

In a possible implementation, the target processing policy information further includes at least one piece of the following information: stopping, by the target charging pile, to charge the target vehicle battery, and notifying, by the target charging pile in voice, the user to start a fire processing procedure of the charging station; and correspondingly, the target processing device is the target charging pile, and in this case, the processing module 1002 is located in the target charging pile, and the processing module 1002 is specifically configured to perform at least one of the following operations by the target charging pile when the target vehicle is being charged by using the target charging pile: stopping charging the target vehicle battery, and notifying, in voice, the user to start the fire processing procedure of the charging station.

In a possible implementation, the target processing policy information further includes at least one piece of the following information: rejecting, by the target charging pile, to charge the target vehicle battery, and notifying, by the target charging pile in voice, the user to start a fire processing procedure of the charging station; and correspondingly, the target processing device is the target charging pile, and in this case, the processing module 1002 is located in the target charging pile, and the processing module 1002 is specifically configured to perform at least one of the following operations by the target charging pile when the target vehicle is to be charged by using the target charging pile: rejecting to charge the target vehicle battery, and notifying, in voice, the user to start the fire processing procedure of the charging station.

In a possible implementation, the target processing policy information further includes at least one piece of the following information: stopping, by the target battery swap station, charging the target vehicle battery, and notifying, by the target battery swap station in voice, the user to start a fire processing procedure of the charging station; and correspondingly, the target processing device is the target battery swap station, and in this case, the processing module 1002 is located in the target battery swap station, and the processing module 1002 is specifically configured to perform at least one of the following operations by the target battery swap station when the target vehicle is being charged by using the target battery swap station: stopping charging the target vehicle battery, and notifying, in voice, the user to start the fire processing procedure of the charging station.

In a possible implementation, the target processing policy information further includes at least one piece of the following information: rejecting, by the target battery swap station, to charge the target vehicle battery, and notifying, by the target battery swap station in voice, the user to start a fire processing procedure of the charging station; and correspondingly, the target processing device is the target battery swap station, and in this case, the processing module 1002 is located in the target battery swap station, and the processing module 1002 is specifically configured to perform at least one of the following operations by the target battery swap station when the target vehicle is to swap a battery by using the target battery swap station: rejecting to charge the target vehicle battery, and notifying, in voice, the user to start the fire processing procedure of the charging station.

In a possible implementation, the target processing policy information further includes at least one piece of the following information: issuing a voice alarm, a short message service message alarm, and a message alarm by the target mobile phone, and reminding the user to leave the target vehicle; and correspondingly, the target processing device is the target mobile phone, and in this case, the processing module 1002 is located in the target mobile phone, and the processing module 1002 is specifically configured to perform at least one of the following operations by the target mobile phone: issuing the voice alarm, the short message service message alarm, and the message alarm, and reminding the user to leave the target vehicle.

Figure 11:
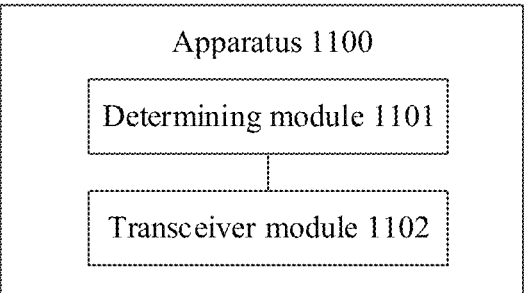
FIG. 11 is a schematic diagram of a structure of a battery safety warning apparatus according to another embodiment of the present disclosure.

FIG. 11 is a schematic diagram of a structure of a battery safety warning apparatus according to an embodiment of the present disclosure. The apparatus 1100 includes a determining module 1101 configured to determine target safety warning level information of a target vehicle battery; where the determining module 1101 is further configured to determine target processing policy information based on mapping relationships between different safety warning levels and processing policies corresponding to different processing devices, where the target processing policy information indicates an operation performed by a target processing device in the target safety warning level information; and a transceiver module 1102 configured to send the target processing policy information and the target safety warning level information to the target processing device.

In a possible implementation, the target safety warning level information is any one of the following: level-1 warning information, level-2 warning information, and level-3 warning information.

In a possible implementation, the target processing device includes at least one of the following: a target vehicle, a target charging pile, a target battery swap station, and a target mobile phone.

In a possible implementation, the determining module 1101 is specifically configured to determine that the target processing policy information includes the following information: turning on a warning light by the target vehicle.

In a possible implementation, when the target vehicle is being charged by using the target charging pile, the determining module 1101 is specifically configured to determine that the target processing policy information further includes the following information: limiting a charging power of the target vehicle battery by the target charging pile.

In a possible implementation, when the target vehicle is swapping a battery by using the target battery swap station, the determining module 1101 is specifically configured to determine that the target processing policy information further includes the following information: limiting the charging power of the target vehicle battery by the target battery swap station.

In a possible implementation, when the target safety warning level information is the level-2 warning information, the determining module 1101 is specifically configured to determine that the target processing policy information includes at least one piece of the following information: turning on a warning light by the target vehicle, and limiting a use power of the target vehicle battery based on a message prompt of the target vehicle.

In a possible implementation, when the target vehicle is being charged by using the target charging pile, the determining module 1101 is specifically configured to determine that the target processing policy information further includes at least one piece of the following information: limiting a charging power of the target vehicle by the target charging pile, and limiting a charging upper limit of the target charging pile.

In a possible implementation, when the target vehicle is swapping a battery by using the target battery swap station, the determining module 1101 is specifically configured to determine that the target processing policy information further includes at least one piece of the following information: limiting a charging power of the target vehicle battery by the target battery swap station, limiting a charging upper limit by the target battery swap station, and starting an after-sales procedure of the target vehicle battery.

In a possible implementation, the determining module 1101 is specifically configured to determine that the target processing policy information further includes at least one piece of the following information: providing fault prompt information by the target mobile phone, and displaying a processing suggestion by the target mobile phone.

In a possible implementation, when the target safety warning level information is the level-3 warning information, the determining module 1101 is specifically configured to determine that the target processing policy information includes at least one piece of the following information: turning on a warning light by the target vehicle, and issuing a voice alarm by the target vehicle.

In a possible implementation, when the target vehicle is traveling or a current vehicle speed of the target vehicle is not 0, the determining module 1101 is specifically configured to determine that the target processing policy information further includes at least one piece of the following information: limiting a use power of the target vehicle battery by the target vehicle, and reminding, by the target vehicle, a user to safely park and leave the target vehicle.

In a possible implementation, when the target vehicle does not travel or a current vehicle speed of the target vehicle is 0, the determining module 1101 is specifically configured to determine that the target processing policy information further includes at least one piece of the following information: unlocking a vehicle door by the target vehicle, and reminding, by the target vehicle in voice, a user to leave the target vehicle and start a fire extinguishing program of the target vehicle.

In a possible implementation, when the target vehicle is being charged by using the target charging pile, the determining module 1101 is specifically configured to determine that the target processing policy information further includes at least one piece of the following information: stopping, by the target charging pile, charging the target vehicle battery, and notifying, by the target charging pile in voice, the user to start a fire processing procedure of the charging station.

In a possible implementation, when the target vehicle is to be charged by using the target charging pile, the determining module 1101 is specifically configured to determine that the target processing policy information further includes at least one piece of the following information: rejecting, by the target charging pile, to charge the target vehicle battery, and notifying, by the target charging pile in voice, the user to start a fire processing procedure of the charging station.

In a possible implementation, when the target vehicle is being charged by using the target battery swap station, the determining module 1101 is specifically configured to determine that the target processing policy information further includes at least one piece of the following information: stopping, by the target battery swap station, charging the target vehicle battery, and notifying, by the target battery swap station in voice, the user to start a fire processing procedure of the charging station.

In a possible implementation, when the target vehicle is to swap a battery by using the target battery swap station, the determining module 1101 is specifically configured to determine that the target processing policy information further includes at least one piece of the following information:

rejecting, by the target battery swap station, to charge the target vehicle battery, and notifying, by the target battery swap station in voice, the user to start a fire processing procedure of the charging station.

In a possible implementation, the determining module 1101 is specifically configured to determine that the target processing policy information further includes at least one piece of the following information: issuing a voice alarm, a short message service message alarm, and a message alarm by the target mobile phone, and reminding the user to leave the target vehicle.

Figure 12:
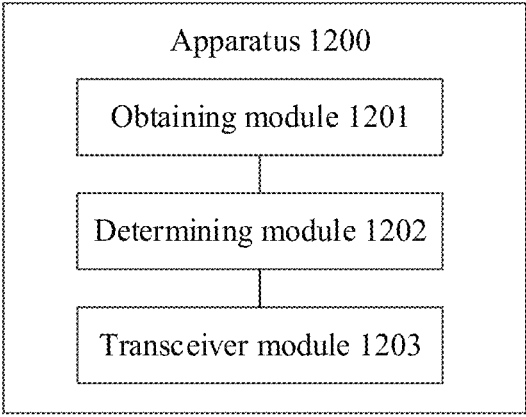
FIG. 12 is a schematic diagram of a structure of a battery safety warning apparatus according to still another embodiment of the present disclosure.

FIG. 12 is a schematic diagram of a structure of a battery safety warning apparatus according to another embodiment of the present disclosure. The apparatus 1200 includes: an obtaining module 1201 configured to obtain N performance values of a target vehicle battery, where the N performance values are in a one-to-one correspondence with N performances of the target vehicle battery, the N performances include M performances of the following performances: a voltage deviation descent speed, an insulation descent speed, a voltage difference at rest, an insulation average level, a cycle average temperature, and a cycle temperature rise rate, M is a positive integer, and N is a positive integer greater than or equal to M; and a determining module 1202 configured to determine battery warning information that has a preset mapping relationship with each of the N performance values as battery warning information of the target vehicle.

In an example, the obtaining module 1201 may be configured to perform the step of obtaining the N performance values of the target vehicle battery in the method in FIG. 2. For example, the obtaining module 1201 is configured to perform S201.

In a possible implementation, the determining module 1202 is specifically configured to: determine, based on a preset mapping relationship between a value of each of the N performances and a value interval to which the value belongs, a performance value interval to which a performance value corresponding to each of the N performances belongs; and determine battery warning information that has a preset mapping relationship with the performance value interval to which each of the N performance values belongs as the battery warning information of the target vehicle.

In a possible implementation, the value interval to which the value of each performance belongs is obtained by dividing a preset value range of each performance based on a warning threshold corresponding to each performance, and the warning threshold corresponding to each performance and a plurality of historical values of each performance satisfy a mapping relationship.

In a possible implementation, the determining module 1202 is specifically configured to: determine, based on a preset mapping relationship between the value interval of each of the N performances and a warning level classified for each performance, a warning level corresponding to the performance value corresponding to each performance in the N performance values; and determine battery warning information that has a preset mapping relationship with each of the N warning levels that are in a one-to-one correspondence with the N performance values as the battery warning information of the target vehicle.

In a possible implementation, the battery warning information of the target vehicle includes at least one piece of the following warning information: level-1 warning information, level-2 warning information, and level-3 warning information.

In a possible implementation, the level-1 warning information indicates that the target vehicle can continue to be used, the level-2 warning information indicates that a function fault maintenance operation needs to be performed on the target vehicle, and the level-3 warning information indicates that an emergency processing operation needs to be performed on the target vehicle.

In a possible implementation, the battery warning system stores mapping relationships between different safety warning levels and processing policies corresponding to different processing devices, and the obtaining module is further configured to obtain, from the mapping relationships, a target processing policy corresponding to a target processing device in the battery warning information of the target vehicle; and correspondingly, the apparatus further includes a transceiver module 1203 configured to send target processing policy information and target safety warning level information to the target processing device.

In a possible implementation, the target processing device includes one of the following: the target vehicle, a charging pile, a battery swap station, and a mobile phone.

Figure 13:
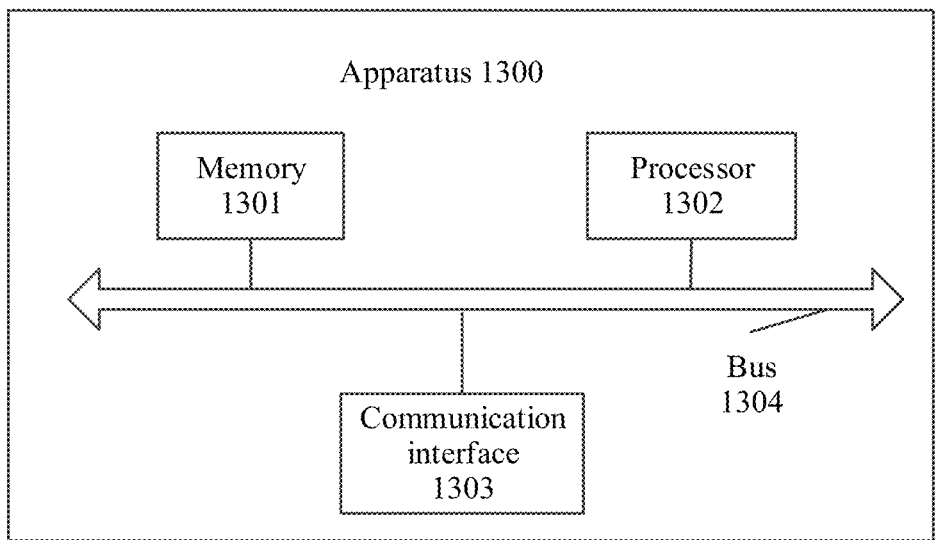
FIG. 13 is a schematic diagram of a structure of a battery safety warning apparatus according to an embodiment of the present disclosure.

FIG. 13 is a schematic diagram of a structure of a safety warning apparatus of a battery according to another embodiment of the present disclosure. The apparatus shown in FIG. 13 may be configured to perform the method according to any one of the foregoing embodiments.

As shown in FIG. 13, the apparatus 1300 in this embodiment includes a memory 1301, a processor 1302, a communication interface 1303, and a bus 1304. The memory 1301, the processor 1302, and the communication interface 1303 are communicatively connected to each other by using the bus 1304.

The memory 1301 may be a read-only memory (ROM), a static storage device, a dynamic storage device, or a random-access memory (RAM). The memory 1301 may store a program. When the program stored in the memory 1301 is executed by the processor 1302, the processor 1302 is configured to perform the steps of the method shown in FIG. 2 or FIG. 7.

The processor 1302 may be a general-purpose central processing unit (CPU), a microprocessor, an application-specific integrated circuit (ASIC), or one or more integrated circuits. The processor 1302 is configured to execute a related program, to implement the method shown in FIG. 2 or FIG. 7 of the present disclosure.

The processor 1302 may alternatively be an integrated circuit chip and has a signal processing capability. In an implementation process, the steps of the method of FIG. 2 or FIG. 7 in embodiments of the present disclosure may be implemented by using an integrated logic circuit of hardware in the processor 1302, or by using instructions in a form of software.

The processor 1302 may alternatively be a general-purpose processor, a digital signal processor (DSP), an ASIC, a field-programmable gate array (FPGA) or another programmable logic device, a discrete gate or transistor logic device, or a discrete hardware component. The methods, steps, and logic block diagrams disclosed in embodiments of the present disclosure may be implemented or executed. The general-purpose processor may be a microprocessor, or the processor may be another processor or the like.

Steps of the method disclosed with reference to embodiments of the present disclosure may be directly performed by a hardware decoding processor, or may be performed by using a combination of hardware and software modules in the decoding processor. A software module may be located in a mature storage medium in the art, such as a RAM, a flash memory, a ROM, a programmable ROM, an electrically erasable programmable memory, or a register. The storage medium is located in the memory 1301. The processor 1302 reads information in the memory 1301, and completes, in combination with hardware of the processor 1302, functions that need to be performed by units included in the apparatus in the present disclosure. For example, the processor 1302 may perform steps/functions in the embodiment shown in FIG. 2 or FIG. 7.

The communication interface 1303 may use, but not limited to, a transceiver apparatus of a transceiver type, to implement communication between the apparatus 1300 and another device or a communication network.

The bus 1304 may include a path for transmitting information between various components (for example, the memory 1301, the processor 1302, and the communication interface 1303) of the apparatus 1300.

It should be understood that the apparatus 1300 shown in this embodiment of the present disclosure may be an electronic device, or may be a chip configured in an electronic device.

All or some of the foregoing embodiments may be implemented by using software, hardware, firmware, or any other combination. When software is used to implement the embodiments, all or some of the foregoing embodiments may be implemented in a form of a computer program product. The computer program product includes one or more computer instructions or computer programs. When the computer instructions or the computer programs are loaded or executed on a computer, the procedures or functions according to embodiments of the present disclosure are entirely or partially generated. The computer may be a general-purpose computer, a dedicated computer, a computer network, or another programmable apparatus. The computer instructions may be stored in a computer-readable storage medium, or transmitted from one computer-readable storage medium to another computer-readable storage medium. For example, the computer instructions may be transmitted from a website, computer, server, or data center to another website, computer, server, or data center in a wired (for example, infrared, wireless, or microwaves) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital versatile disc (DVD)), a semiconductor medium, or the like. The semiconductor medium may be a solid-state drive.

It should be understood that the term "and/or" in this specification describes only an association relationship between associated objects and represents that three relationships may exist. For example, A and/or B may represent the following three cases: only A exists, both A and B exist, and only B exists. A and B may be singular or plural. In addition, the character "/" in this specification usually indicates an "or" relationship between the associated objects, but may also indicate an "and/or" relationship. For details, refer to the context for understanding.

In the present disclosure, "at least one" means one or more, and "a plurality of" means two or more. At least one of the following items (pieces) or a similar expression thereof means any combination of these items, including any combination of singular items (pieces) or plural items (pieces). For example, at least one of a, b, or c may indicate: a, b, c, a-b, a-c, b-c, or a-b-c, where a, b, and c may be singular or plural.

It should be understood that sequence numbers of the foregoing processes do not mean execution sequences in various embodiments of the present disclosure. The execution sequences of the processes should be determined based on functions and internal logics of the processes, and should not constitute any limitation on the implementation processes of embodiments of the present disclosure.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments.

In the several embodiments provided in the present disclosure, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of the present disclosure may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure may be reflected in the form of a software product. The computer software product is stored in a storage medium, and includes several instructions for instructing a computer device (which may be a personal computer, a server, or a network device) to perform all or some of the steps of the methods described in embodiments of the present disclosure. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of the present disclosure, but the protection scope of the present disclosure is not limited thereto. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method, comprising:
obtaining N performance values of a target vehicle battery, wherein the N performance values are in a one-to-one correspondence with N performances of the target vehicle battery, and wherein N is a positive integer;
determining battery warning information that has a first preset mapping relationship with each of the N performance values as target safety warning level information of the target vehicle battery, wherein the target safety warning level information comprises a target processing device, and wherein the target processing device comprises a target vehicle;
determining target processing policy information based on mapping relationships between safety warning levels and processing policies of processing devices, wherein the target processing policy information indicates an operation of the target processing device, and wherein the operation comprises limiting a charging power of the target vehicle; and
sending the target processing policy information, an instruction to perform the operation, and the target safety warning level information to the target processing device.

2. The method according to claim 1, wherein the target safety warning level information is level-1 warning information, level-2 warning information, or level-3 warning information.

3. The method according to claim 1, wherein the target processing device further comprises at least one of a target charging pile, a target battery swap station, or a target mobile phone.

4. The method according to claim 2, wherein determining the target processing policy information comprises determining, when the target safety warning level information is the level-1 warning information, that the target processing policy information further comprises turning on a warning light by the target vehicle.

5. The method according to claim 4, wherein determining the target processing policy information further comprises determining, when the target vehicle is being charged by using a target charging pile, that the target processing policy information further comprises limiting the charging power of the target vehicle battery by the target charging pile.

6. The method according to claim 4, wherein determining the target processing policy information further comprises determining, when the target vehicle is swapping a battery using a target battery swap station, that the target processing policy information further comprises limiting the charging power of the target vehicle battery by the target battery swap station.

7. The method according to claim 2, wherein determining the target processing policy information comprises determining, when the target safety warning level information is the level-3 warning information, that the target processing policy information further comprises at least one of turning on a warning light by the target vehicle or issuing a voice alarm by the target vehicle.

8. The method according to claim 7, wherein determining the target processing policy information further comprises determining, when a vehicle speed of the target vehicle is not 0, that the target processing policy information further comprises at least one of limiting a use power of the target vehicle battery by the target vehicle or reminding, by the target vehicle, a user to safely park and leave the target vehicle.

9. The method according to claim 7, wherein determining the target processing policy information further comprises determining, when a vehicle speed of the target vehicle is 0, that the target processing policy information further comprises at least one of unlocking a vehicle door by the target vehicle or providing, by the target vehicle, a voice instruction to a user to leave the target vehicle and start a fire extinguishing program of the target vehicle.

10. The method according to claim 7, wherein determining the target processing policy information further comprises determining, when the target vehicle is being charged by using a target charging pile, that the target processing policy information further comprises at least one of stopping, by the target charging pile, charging of the target vehicle battery, or providing, by the target charging pile, a voice notification to a user to start a fire processing procedure of a charging station.

11. The method according to claim 7, wherein determining the target processing policy information further comprises determining, when the target vehicle is to be charged by using a target charging pile, that the target processing policy information further comprises at least one of rejecting, by the target charging pile, charging of the target vehicle battery, or providing, by the target charging pile, a voice notification to a user to start a fire processing procedure of a charging station.

12. The method according to claim 2, wherein determining the target processing policy information comprises determining that the target processing policy information further comprises:

issuing at least one of a voice alarm, a short message service message alarm, or a message alarm by a target mobile phone; and reminding a user to leave the target vehicle.

13. The method according to claim 1, wherein the N performances comprise M performances of the following performances: a voltage deviation descent speed, an insulation descent speed, a voltage difference at rest, an insulation average level, a cycle average temperature, and a cycle temperature rise rate, wherein M is a first positive integer, and wherein N is a second positive integer greater than or equal to M.

14. The method according to claim 1, wherein determining the battery warning information comprises:

determining, based on a second preset mapping relationship between a performance value of each of the N performance values and a value interval to which the performance value belongs, a performance value interval of the performance value; and determining the battery warning information based on the performance value interval.

15. The method according to claim 14, wherein the value interval is based on a preset value range of each performance and a warning threshold corresponding to each performance, wherein the warning threshold and a plurality of historical values of each performance satisfy a mapping relationship.

16. The method according to claim 14, wherein determining the battery warning information comprises:

determining, based on a third preset mapping relationship between the performance value interval and a first warning level classified for each performance, a second warning level corresponding to the performance value; and determining the battery warning information based on the second warning level.

17. An apparatus comprising:

a memory configured to store programming instructions; and a processor coupled to the memory and configured to execute the programming instructions to cause the apparatus to:

obtain N performance values of a target vehicle battery, wherein the N performance values are in a one-to-one correspondence with N performances of the target vehicle battery, and wherein N is a positive integer;

determine battery warning information that has a first preset mapping relationship with each of the N performance values as target safety warning level information of the target vehicle battery, wherein the target safety warning level information comprises a target processing device, and wherein the target processing device comprises a target vehicle;

determine target processing policy information based on mapping relationships between safety warning levels and processing policies of processing devices, wherein the target processing policy information indicates an operation of the target processing device, and wherein the operation comprises limiting a charging power of the target vehicle; and send the target processing policy information, an instruction to perform the operation, and the target safety warning level information to the target processing device.

18. The apparatus according to claim 17, wherein the target safety warning level information is level-1 warning information, level-2 warning information, or level-3 warning information.

19. The apparatus according to claim 18, wherein the target processing device further comprises at least one of a target charging pile, a target battery swap station, or a target mobile phone, and wherein the processor is further configured to execute the programming instructions to cause the apparatus to determine the target processing policy information by determining, when the target safety warning level information is the level-1 warning information, that the target processing policy information comprises turning on a warning light by the target vehicle.

20. A computer program product comprising computer instructions, wherein when one or more processors execute the computer instructions, the computer instructions cause the one or more processors to:

obtain N performance values of a target vehicle battery, wherein the N performance values are in a one-to-one correspondence with N performances of the target vehicle battery, and wherein N is a positive integer;

determine battery warning information that has a first preset mapping relationship with each of the N performance values as target safety warning level information of the target vehicle battery, wherein the target safety warning level information comprises a target processing device, and wherein the target processing device comprises a target vehicle;

determine target processing policy information based on mapping relationships between safety warning levels and processing policies of processing devices, wherein the target processing policy information indicates an operation of the target processing device, and wherein the operation comprises limiting a charging power of the target vehicle; and send the target processing policy information, an instruction to perform the operation, and the target safety warning level information to the target processing device.

\* \* \* \* \*